US009649952B2

(12) United States Patent
Graber

(10) Patent No.: US 9,649,952 B2
(45) Date of Patent: May 16, 2017

(54) ELECTROMAGNETIC FIELD GENERATOR

(71) Applicant: Curtis E. Graber, Woodburn, IN (US)

(72) Inventor: Curtis E. Graber, Woodburn, IN (US)

(*) Notice: Subject to any disclaimer, the term of this patent is extended or adjusted under 35 U.S.C. 154(b) by 375 days.

(21) Appl. No.: 14/584,450

(22) Filed: Dec. 29, 2014

(65) Prior Publication Data

US 2015/0183339 A1   Jul. 2, 2015

Related U.S. Application Data

(60) Provisional application No. 61/921,815, filed on Dec. 30, 2013.

(51) Int. Cl.
*B60L 13/00* (2006.01)
*B60L 13/04* (2006.01)
*B60L 13/10* (2006.01)
*H01F 5/00* (2006.01)

(52) U.S. Cl.
CPC .............. *B60L 13/04* (2013.01); *B60L 13/10* (2013.01); *H01F 2005/006* (2013.01)

(58) Field of Classification Search
CPC ................................. B60L 13/04; B60L 13/10
See application file for complete search history.

(56) References Cited

U.S. PATENT DOCUMENTS

| 433,702 | A | 8/1890 | Tesla |
|---|---|---|---|
| 514,168 | A | 2/1894 | Tesla |
| 586,193 | A | 7/1897 | Marconi |
| 593,138 | A | 11/1897 | Tesla |
| 624,516 | A | 5/1899 | Marconi |
| 627,650 | A | 6/1899 | Marconi |
| 647,007 | A | 4/1900 | Marconi |
| 647,008 | A | 4/1900 | Marconi |
| 647,009 | A | 4/1900 | Marconi |
| 650,110 | A | 5/1900 | Marconi |
| 668,315 | A | 2/1901 | Marconi |
| 685,958 | A | 11/1901 | Tesla |
| 723,188 | A | 3/1903 | Tesla |
| 725,605 | A | 4/1903 | Tesla |
| 760,463 | A | 5/1904 | Marconi |
| 1,119,732 | A * | 12/1914 | Tesla ................ H01Q 1/38 200/48 R |

(Continued)

FOREIGN PATENT DOCUMENTS

WO    2012/131322 A1    10/2012

OTHER PUBLICATIONS

Notification of Transmittal of the International Search Report and the Written Opinion of the International Searching Authority, or the Declaration dated Apr. 30, 2015 for International Application No. PCT/US2014/072767 (9 pages).

*Primary Examiner* — Jason C Smith
(74) *Attorney, Agent, or Firm* — Taylor IP, P.C.

(57) ABSTRACT

A rotating electromagnetic field generation device including a plurality of electrodes, a plurality of electromagnetic field generators, and a controller. The electromagnetic field generators each have a first electric potential output and a second electric potential output. The controller is configured to dynamically switch the first electric potential output and the second electric potential output of each of the plurality of electromagnetic field generators to corresponding selected ones of the plurality of electrodes thereby projecting at least one electromagnetic field from the plurality of electrodes.

20 Claims, 31 Drawing Sheets

(56) References Cited

U.S. PATENT DOCUMENTS

| | | | | |
|---|---|---|---|---|
| 1,424,065 | A * | 7/1922 | Armstrong | H03D 11/02 |
| | | | | 329/359 |
| 4,979,445 | A * | 12/1990 | Lanzara | B60L 13/10 |
| | | | | 104/281 |
| 6,218,998 | B1 * | 4/2001 | Van Voorhies | H01Q 11/08 |
| | | | | 343/741 |
| 6,933,819 | B1 * | 8/2005 | Koonce | A61N 5/00 |
| | | | | 335/296 |
| 7,583,172 | B2 * | 9/2009 | Koonce | H01F 5/00 |
| | | | | 313/153 |
| 2004/0123766 | A1 * | 7/2004 | van den Bergh | B60L 13/10 |
| | | | | 104/281 |
| 2007/0089636 | A1 * | 4/2007 | Guardo | B60L 13/10 |
| | | | | 104/281 |
| 2013/0147582 | A1 * | 6/2013 | Athanassios | H01F 6/00 |
| | | | | 335/216 |
| 2015/0183339 | A1 * | 7/2015 | Graber | B60L 13/04 |
| | | | | 104/282 |

\* cited by examiner

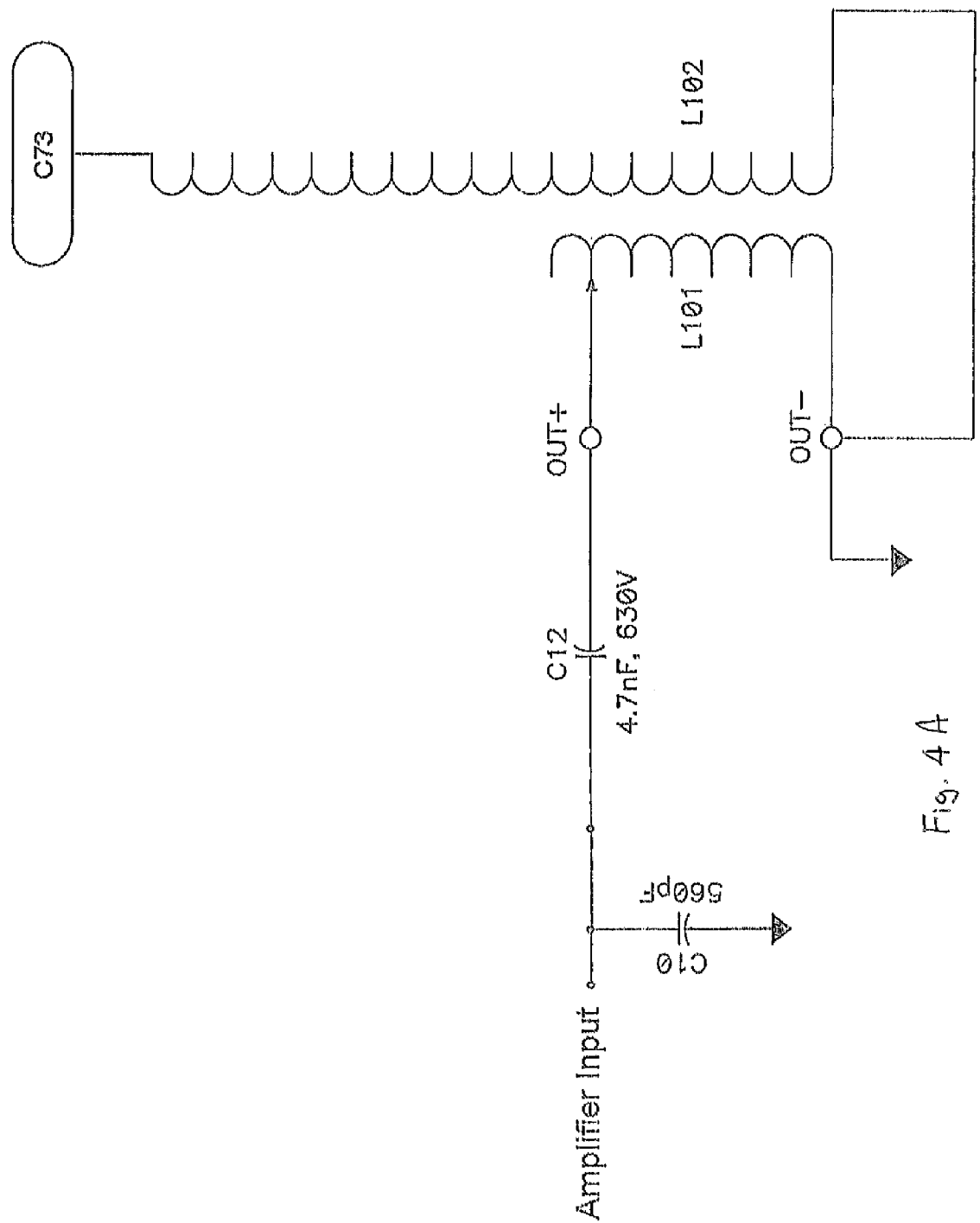

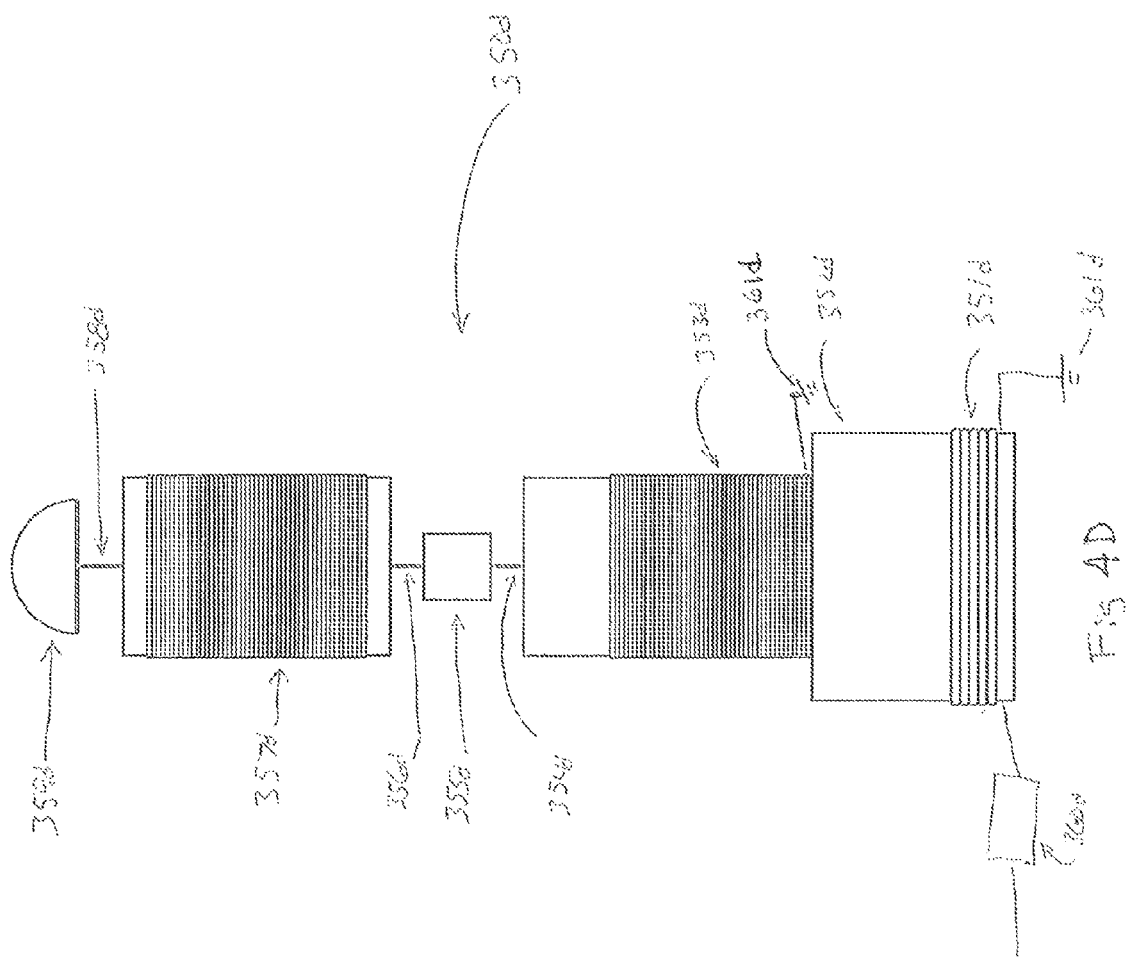

ELECTROMAGNETIC FIELD GENERATOR

CROSS REFERENCE TO RELATED APPLICATIONS

This is a non-provisional application based upon U.S. provisional patent application Ser. No. 61/921,815, entitled "ELECTROMAGNETIC FIELD GENERATOR", filed Dec. 30, 2013, which is incorporated herein by reference.

BACKGROUND OF THE INVENTION

1. Field of the Invention

The present invention relates to electromagnetic field generators and more particularly to a generator that generates a spinning electromagnetic field.

2. Description of the Related Art

Nikola Tesla did poly-phased electrical systems work in the 1890's-1920's, and he also did resonant transformer coil work 1900-1940's, receiving U.S. Pat. Nos. 433,702; 514,168; 593,138; and 685,958. Tesla and Marconi did RF resonant "Radio" circuit work in the 1900-1940's, with Tesla receiving U.S. Pat. Nos. 723,188; 725,605; and 1,119,732; and Marconi receiving U.S. Pat. Nos. 586,193; 624,516; 627,650; 647,007; 647,008; 647,009; 650,110; 668,315; and 760,463.

Dr. Armstrong did radio work in 1915-1954 and among his patents he received U.S. Pat. No. 1,424,065. Van Voorhies received a patent for a tuning toroid antennae for a high voltage circuit (U.S. Pat. No. 6,218,998). With Gene Koonce inventing a Multi-frequency electromagnetic field generator capable of generating electro-magnetic radial fields, horizontal fields and spiral flux fields that are projected at a distance from the device and collected at the far end of the device by an antenna. Koonce received U.S. Pat. Nos. 6,933,819 and 7,583,172.

Although the Koonce patents seem to be the most relevant art found, it is apparently directed to a single emitter machine of medical quackery. In response to FDA pressure, Vibe Technologies of Greeley, Colorado issued a Class I recall of the Vibrational Integrated 1310-photonic Energizer (VIBE) Machine Multi-Frequency Field Generator, a device marketed with far-fetched claims that it can improve health and cure a long list of serious diseases by correcting alleged problems with cell vibration (Barrett S. QuantumPulse (V.I.B.E.) device marketed with far-fetched claims. Quackwatch, Nov. 4, 2008). Among other things the recall notice stated that "Class I recalls are the most serious type of recall and involve situations in which there Is a reasonable probability that use of the product will cause injury or death."

Transportation devices such as a maglev train depend upon a magnetic field that is generated in the train of a repelling force to that beneath the train, in the track. The magnetic fields that are generated are such that they effectively create a trough of magnetic fields in which the weight of the train is offset or magnetically levitated to eliminate rolling fiction. The maglev train functions effectively as a linear electric motor to levitate and propel the train along the proscribed track.

What is needed in the art is a way to efficiently and effectively generate spinning poly-phased electromagnetic fields to lift and propel a mass.

SUMMARY OF THE INVENTION

The present invention provides a resonant spinning electrical field generator capable of producing, simple, poly-phased and complex interference field spinning electron field geometries.

The invention in one form is directed to a rotating electromagnetic field generation device including a plurality of electrodes, a plurality of electromagnetic field generators, and a controller. The electromagnetic field generators each have a first electric potential output and a second electric potential output. The controller is configured to dynamically switch the first electric potential output and the second electric potential output of each of the plurality of electromagnetic field generators to corresponding selected ones of the plurality of electrodes thereby projecting at least one electromagnetic field from the plurality of electrodes.

The invention in another form is directed to a mass transport device including a vehicle for transporting mass, a lift system coupled to the vehicle, the lift system including a rotating electromagnetic field generation device. The rotating electromagnetic field generation device including a plurality of electrodes, a plurality of electromagnetic field generators, and a controller. The electromagnetic field generators each have a first electric potential output and a second electric potential output. The controller is configured to dynamically switch the first electric potential output and the second electric potential output of each of the plurality of electromagnetic field generators to corresponding selected ones of the plurality of electrodes thereby projecting at least one electromagnetic field from the plurality of electrodes.

The invention in another form is directed to a method of generating an electric field, including the step of generating a resonant spinning electrical field using a device that is configured to generate simple, poly-phased and complex interference field geometries.

The invention in another form is directed to an electromagnetic field generation system including an array of discreetly controlled generators configured to create a spinning multi-phased electron field.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
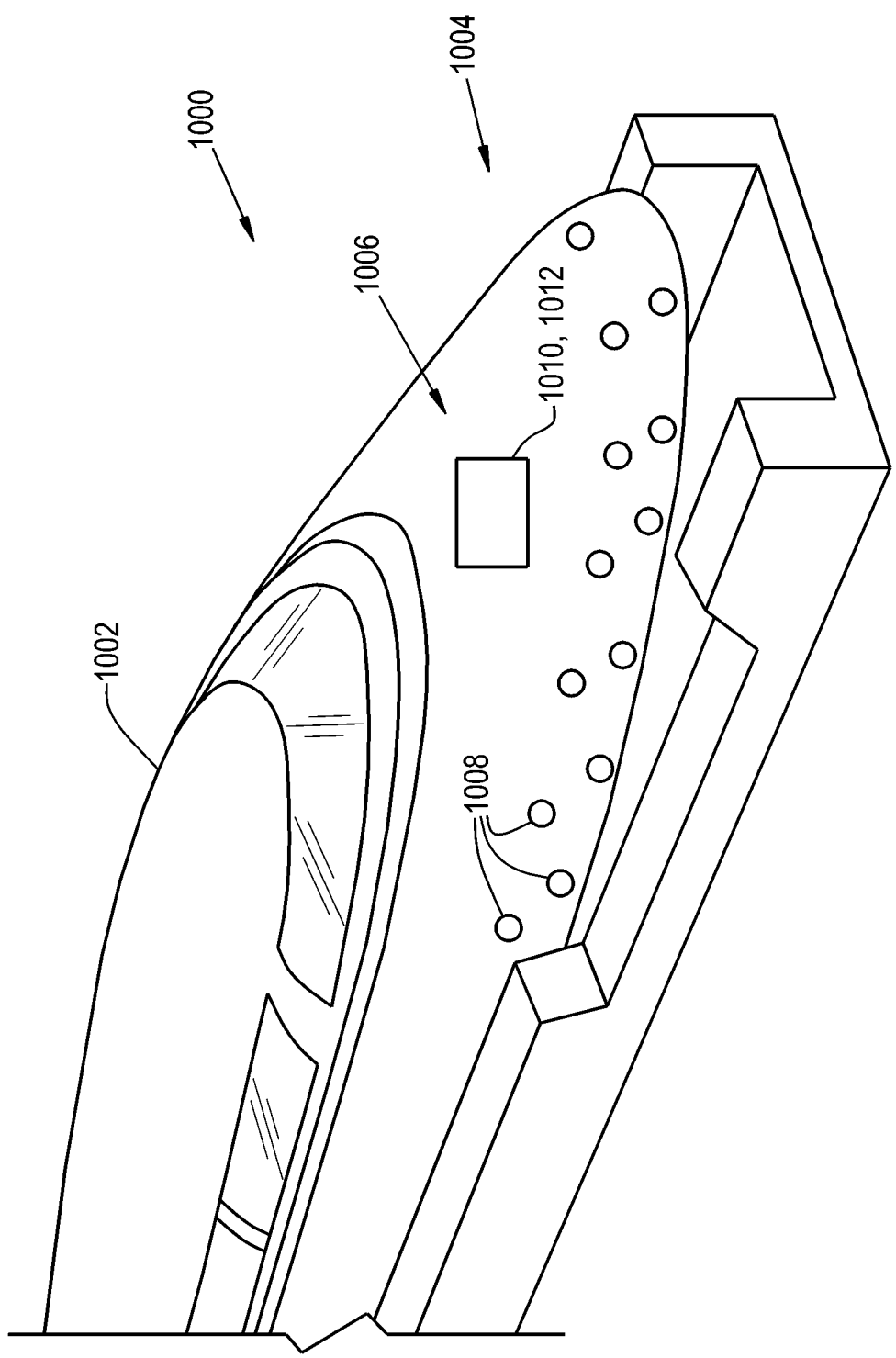
FIG. 1 illustrates a transport vehicle using an embodiment of a rotating electromagnetic field generation device of the present invention.

Referring now to the drawings, and more particularly to FIG. 1, there is shown a transport system 1000, including a train 1002, and a lift system 1004. Lift system 1004 includes an electromagnetic field generation device 1006 having electrodes 1008 (variously referred to herein as anodes, cathodes and or emitters), electromagnetic field generators 1010, and a controller 1012. Electrodes 1008 are arranged in multiple rows and are discussed herein as dual emitter planes. Unlike the prior art that uses static or relatively low frequency electromagnetic fields to provide the lifting and propelling of a mass, such as train 1002, the present invention provides an electromagnetic fields generator system 1006 to effect lift, directional control, and propulsion.

Figure 2A:
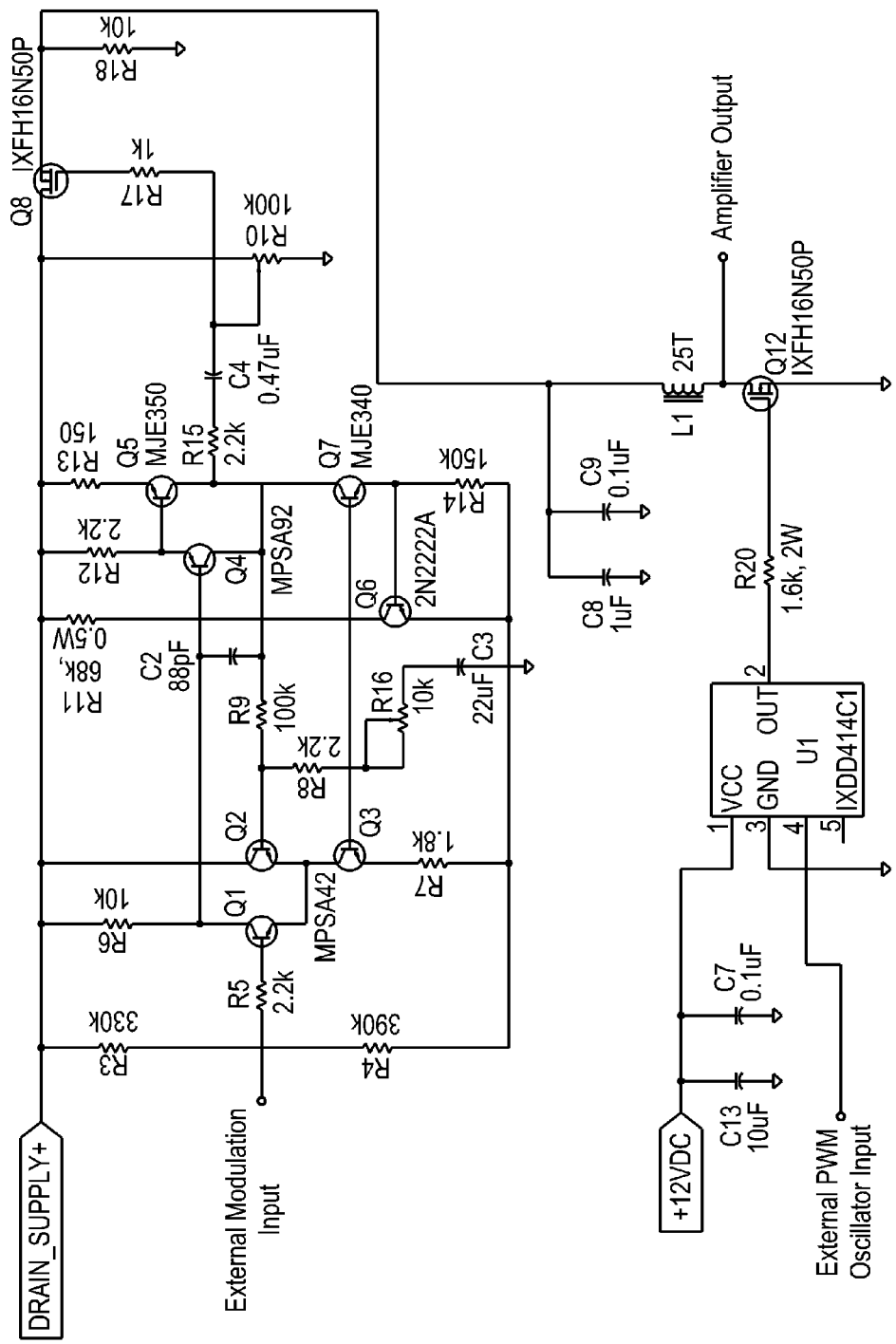
FIG. 2A illustrates a Class -E Amplifier circuit with external Pulse Width Modulation input used as a part of an embodiment of an electron field generator of the present invention.
Figure 2B:
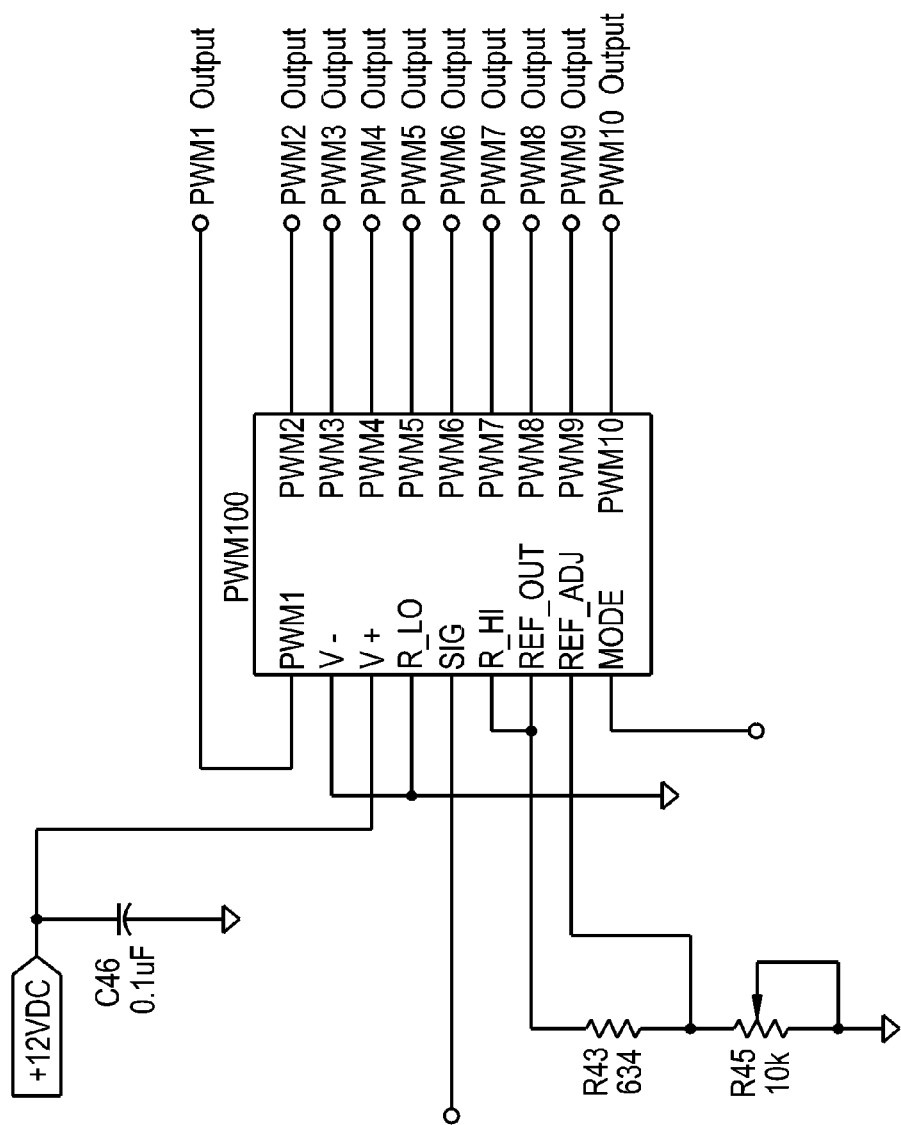
FIG. 2B illustrates part of a control system that choreographs the spinning poly-phase electrical fields generated by the present invention.
Figure 2C:
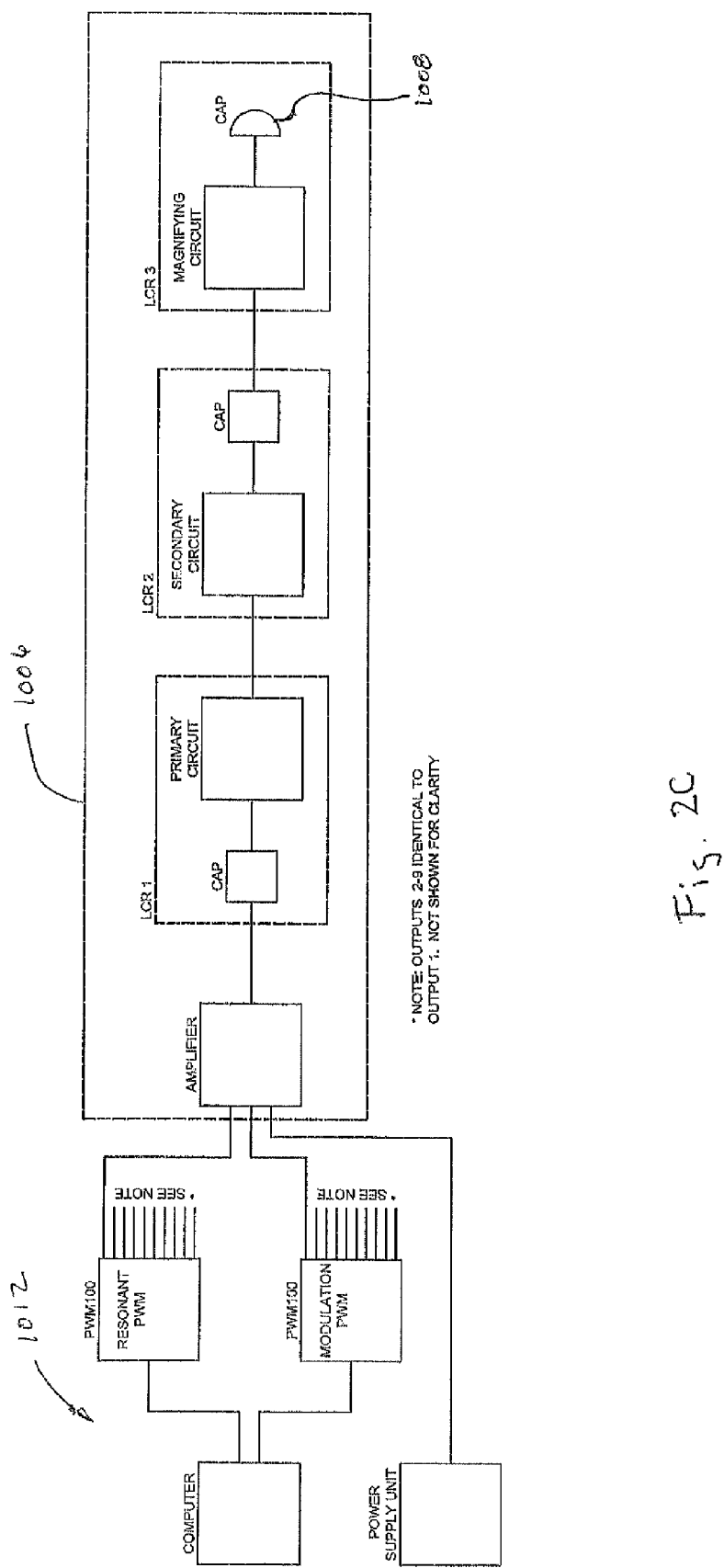
FIG. 2C illustrates an overview of an embodiment of the control system of the present invention which incorporates circuits illustrated in the other figures and as discussed herein.

In FIGS. 2A-3B, there is shown a Class-E PWM amplifier circuit (see an example in FIG. 2A) powered by a power supply circuit (see examples of power supplies in FIGS. 3A and 3B) triggered in synchronous and asynchronous modes with PWM phased driver circuit (see an example in FIG. 2B). FIG. 2C illustrates a computer 1012 that controls Resonant PWM Driver, think of this as in a similar manner as a "carrier wave" of AM radio station, and the Modulation PWM driver, in this example as the "audio content" on a radio station carrier. Each output can then be discretely phased in both carrier waveform and in the modulation waveform applied to each discrete amplifier circuit.

The amplifier directly drives the reactive circuit (LCR) LCR1 (Primary cap/coil) portion of the circuit which then is inducted into a LCR2 circuit and also into a LCR3 circuit. Note that in this design, at least the LCR 3 circuit, in particular, is intended to be located within the field of LCR1.

The pulse timing of the output of LCR2 to LCR 3 is coincident to the chirp inductance pulse from LCR1 so that they are complimentary and additive to the circuit output. A variant of this circuit in moderate sized scale is capable of reaching into the 10's of millions of volts and even into the 100's of millions of volts in very large scale designs operating at frequencies of 100 KHz to many MHz.

The present invention allows switching of High voltage/current at very high frequency with incredible accuracy using this array of the present invention. An amplifier output stage is resonant at or near the target resonance of a single stage step oscillator (see an example in FIG. 4A) or that of a multi-stage magnified step oscillator circuit (see an example in FIG. 4B). The present invention generates a resonant or quasi-resonant multi-poled spinning electrical field capable of the manipulation of materials and materials processing methodologies and a material's mass in a near-field.

Figure 3A:
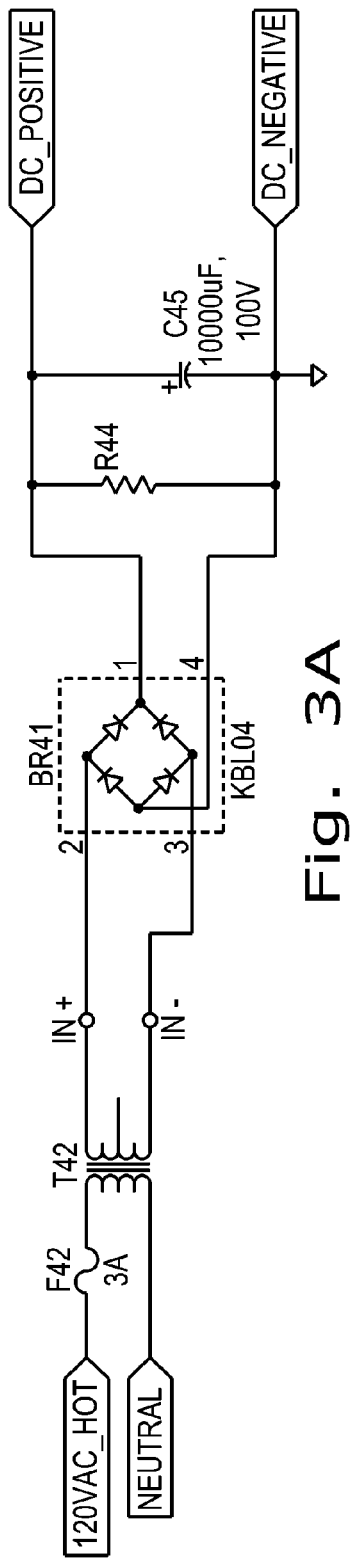
FIGS. 3A and 3B illustrate possible Class-E Amplifier power supply circuits for use with the present invention.

Relative to the Amplifier electronics of the present invention, input voltage source of 120 VAC is isolation transformed with a step up transformer T42, as illustrated in FIG. 3A, and then rectified to DC in bridge rectifier BR41 and smoothed by capacitor C45 to produce low ripple clean DC for the amplifier rail Input.

Figure 3B:
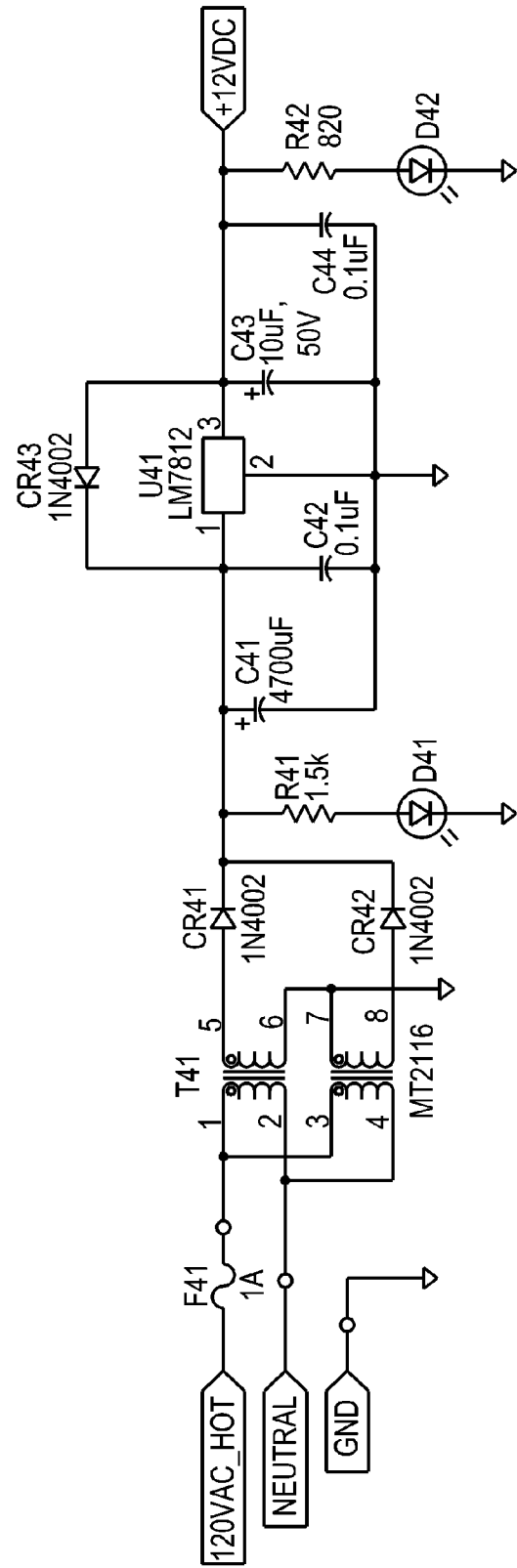

Low control voltage is transformed from 120 VAC in T41 and regulated to 12 VDC, as illustrated in FIG. 3B, for the control circuitry power of the amplifier and PWM circuitry in the system.

A local microprocessor or other control computer 1012 produces spin geometry signals and passes the PWM requirements to PWM100 multi discrete driver output circuit (see example FIG. 2B) where the output of each PWM control leg is sent discretely to each Class E amplifier. Each Class-E amplifier is connected to either a single stage resonant step oscillator circuit (see for example FIG. 4A) or a Multi-stage resonant step oscillator circuit (see for example FIG. 4B)

Electrical resonance output of capacitive top-load (C73 or C74) is defined by the relationship of known properties of the electrical LCR circuit. Additional harmonic content can be modulated upon the output of the Class-E PWM circuit with the Input of a preferred signal or waveform into the External Modulation Input, depicted in FIG. 2A, of the Class-E amplifier circuit.

Figure 13:
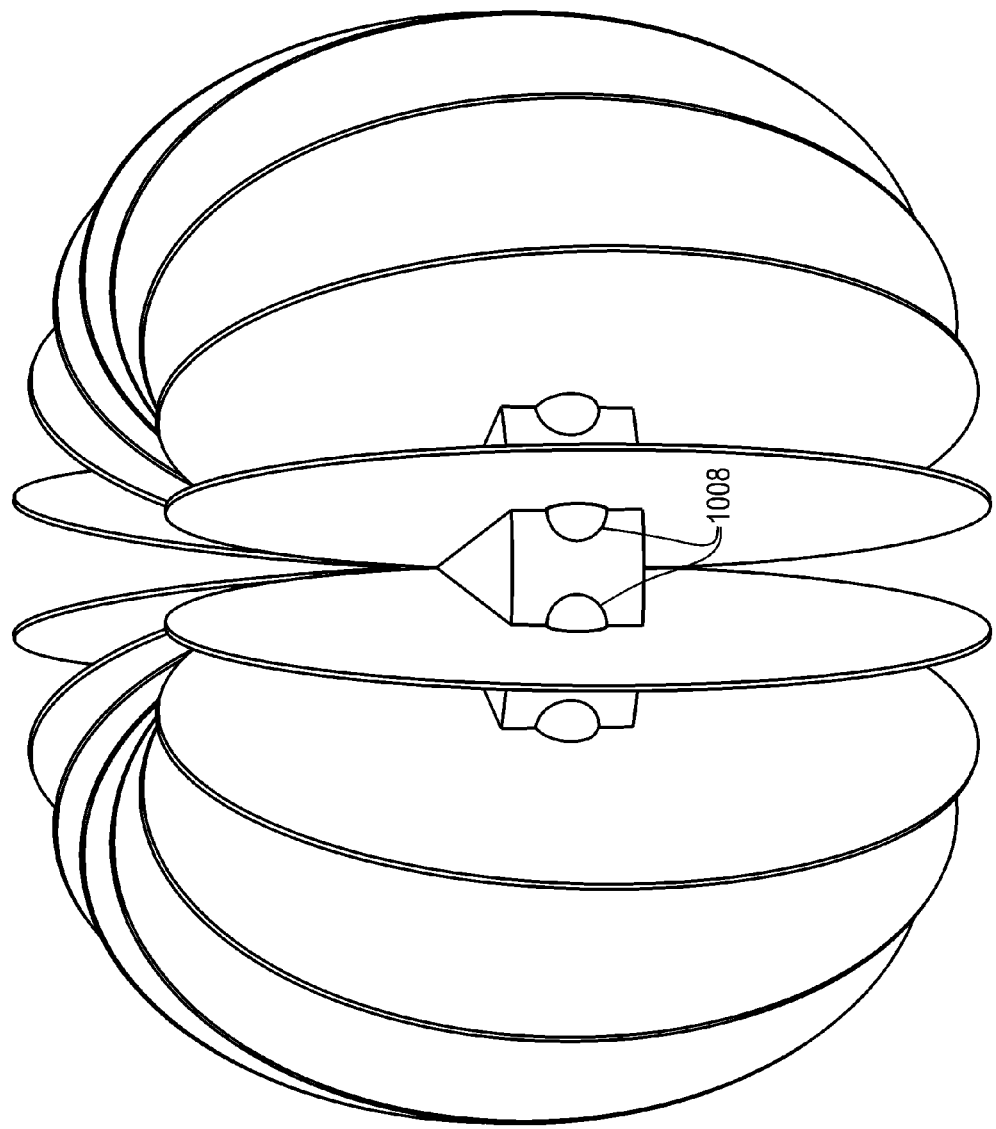
FIG. 13 illustrates a single emitter plane with a rotational linear iso-phase/amplitude relationship electromagnetic field scenario that can be generated by the present invention.
Figure 14:
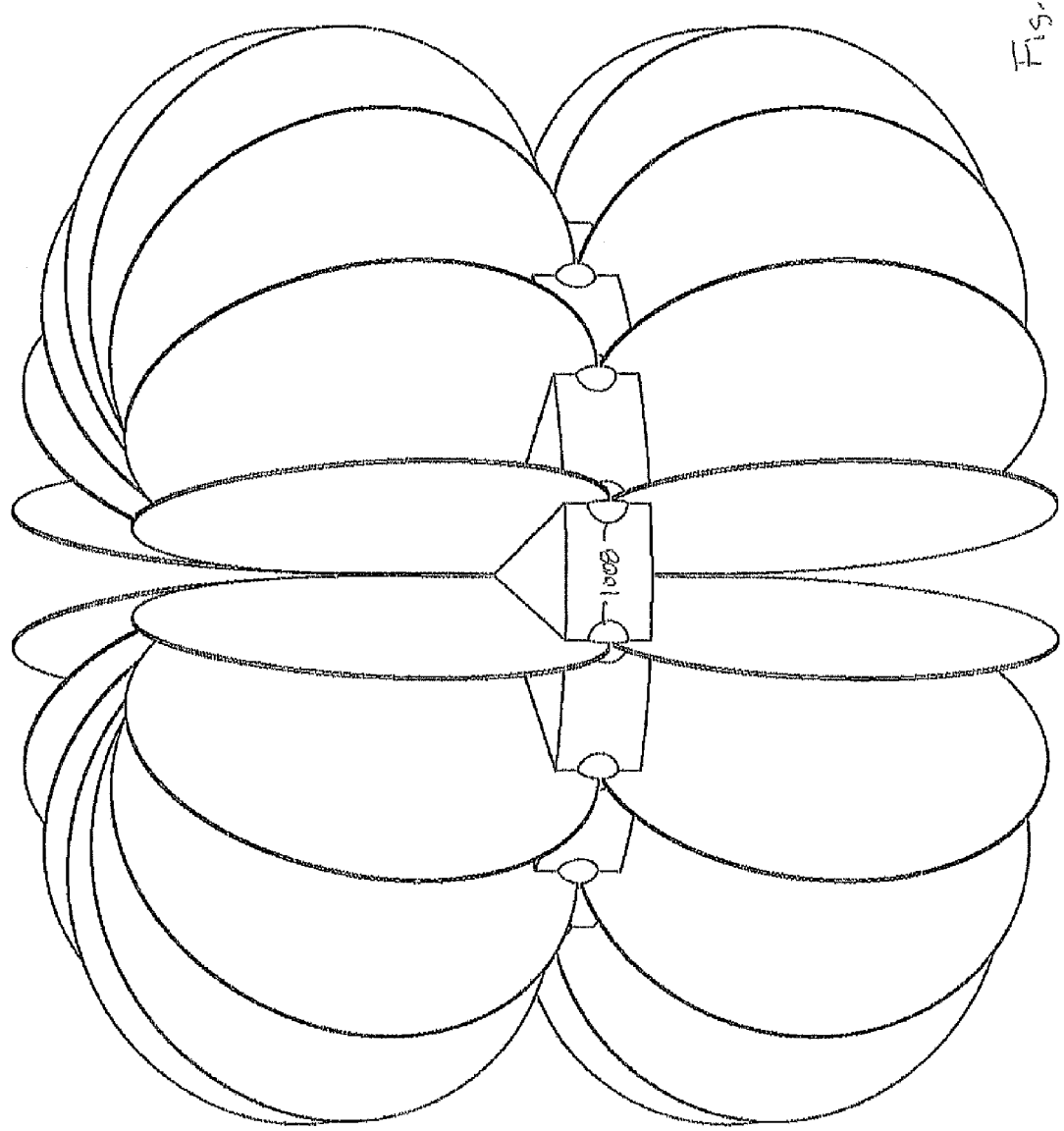
FIG. 14 illustrates a single emitter plane with a rotational linear poly-phase/amplitude relationship electromagnetic field scenario that can be generated by the present invention.
Figure 19:
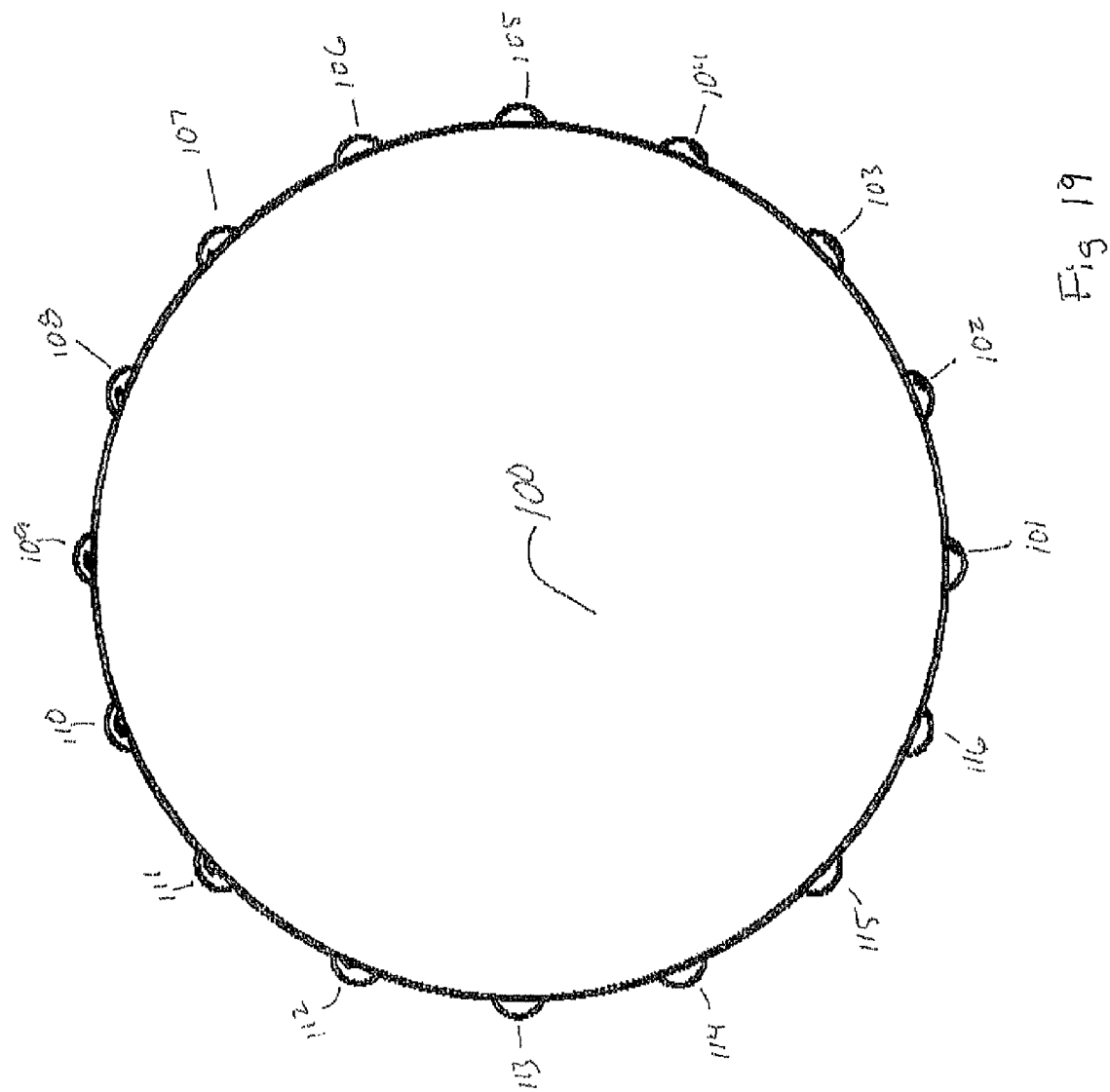
FIG. 19 illustrates a single emitter array plane with capacitive emitters of the present invention.

An array plane 100 of resonant emitters 101-116 (discretely identified electrodes 1008) of FIG. 19 of resonant oscillator circuits (see examples in FIGS. 4A and 4B), which can be configured in a simple stacked arrangement (see for example FIGS. 4C and 4D) or preferably in a compact folded cascade resonate oscillator (see examples in FIGS. 4E, 4F and 4G) and discrete emitter signal generated by PWM discrete circuit server (see FIG. 2B) applied to each class-E amplifier circuit (see FIG. 2A) and applied to discrete resonate oscillators allows the user to create a spinning resonant high voltage/high frequency electrical field (see the field lines of FIGS. 13 and 14) where the emitters 1008 are poled against the ground plane of the array body (FIG. 13) or each body half (upper/lower shell as in FIG. 14).

Figure 15:
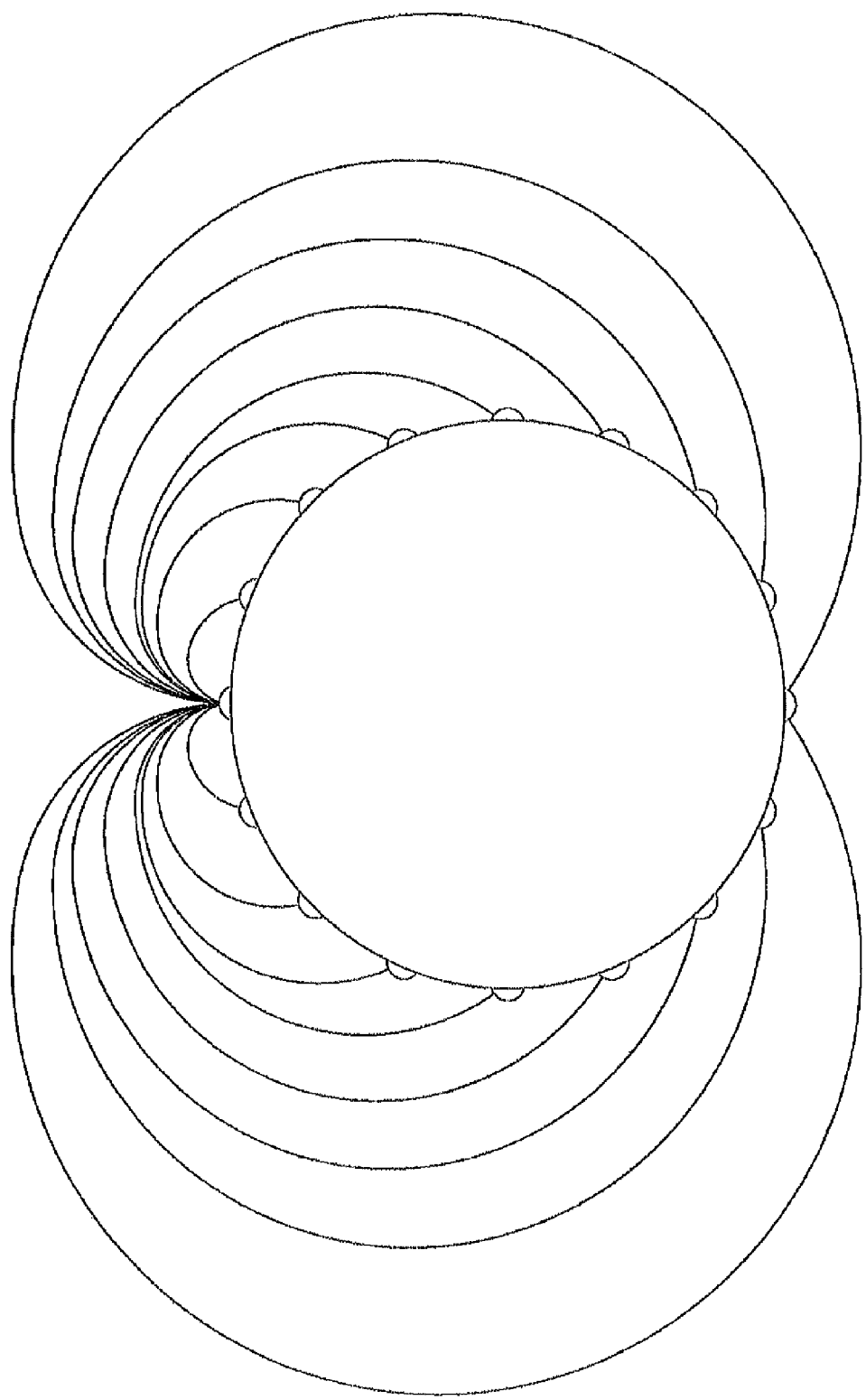
FIG. 15 illustrates a single emitter plane with a cascaded-monolithic polarization relationship electromagnetic field scenario that can be generated by the present invention.

Discrete control of each emitter allows for the spinning electromagnetic field to utilize a single emitter as the monolithic anode to a group of array cathodes or a complex configuration where each emitter can be simultaneously phased with or against other emitters (see FIG. 15) or the ground plane upper and lower shell of the array body.

Figure 20:
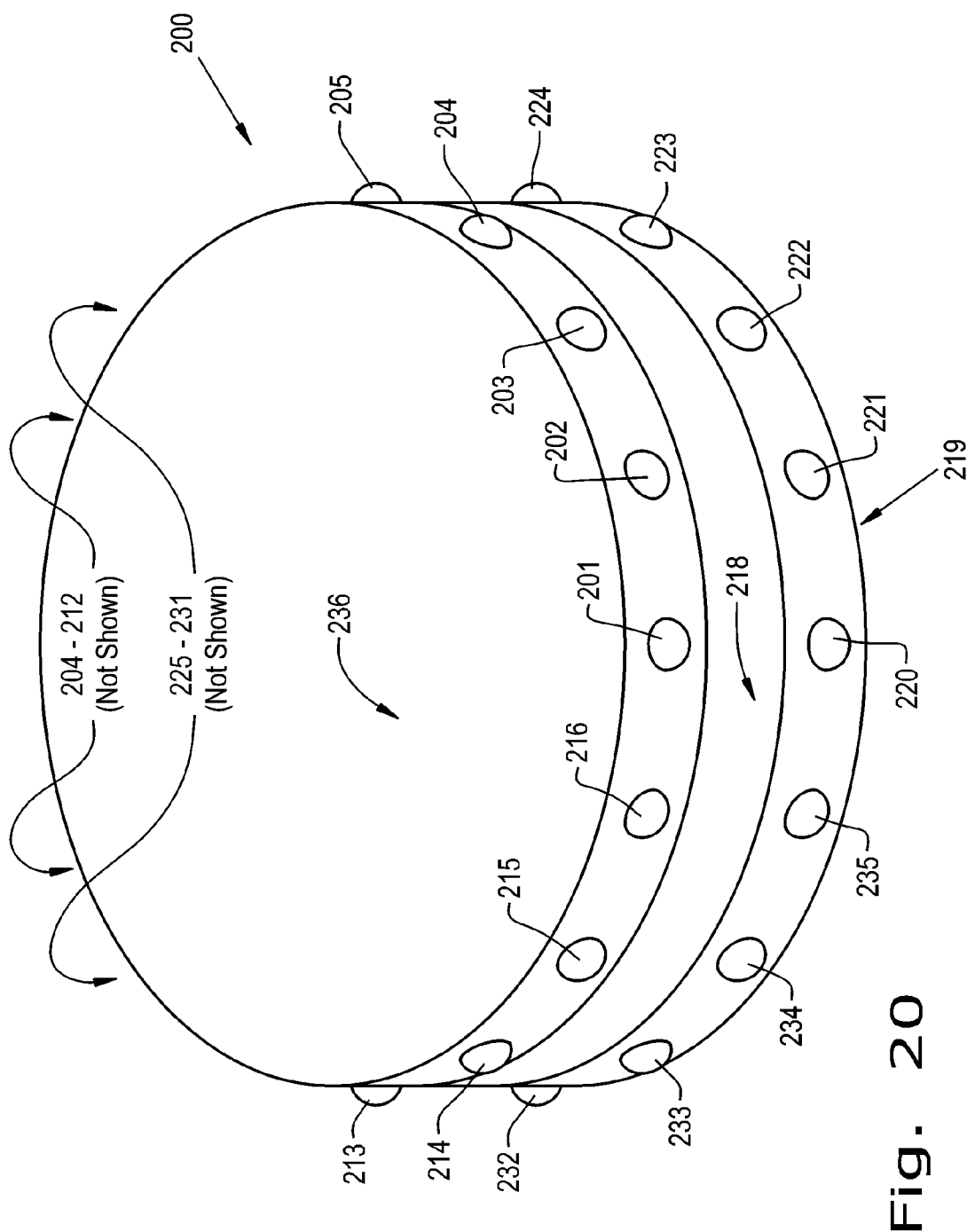
FIG. 20 illustrates a dual emitter array plane with capacitive emitters of the present invention.
Figure 21:
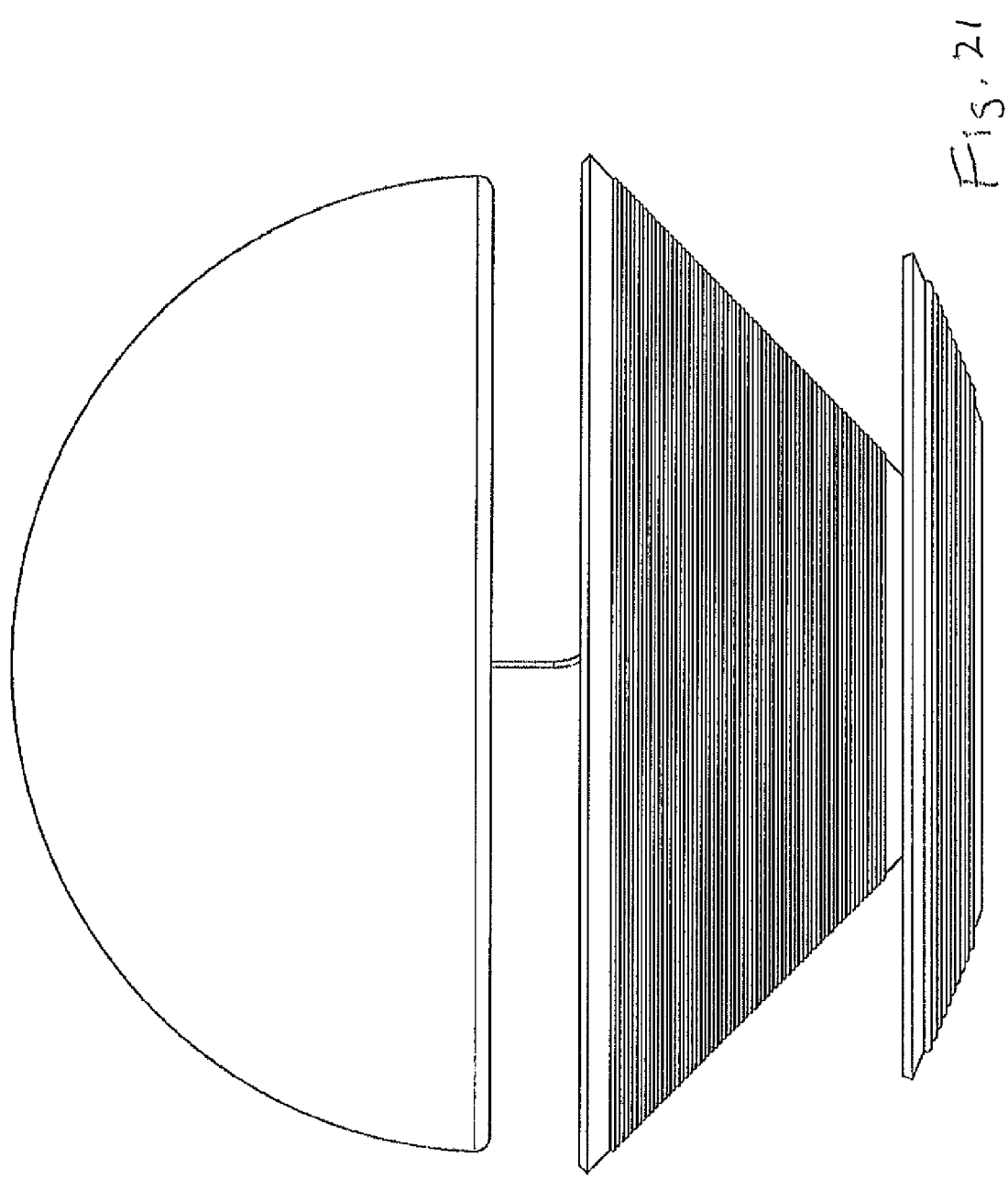
FIG. 21 illustrates a single stage compact resonant oscillator with capacitive top load of the present invention.

Further complex field spin geometries can be produced with a dual array plane 200 of FIG. 20 where discrete emitters 201-216 and 220-235 are separated by insulator 218 and located between ground plane face 235 and 219.

Figure 16:
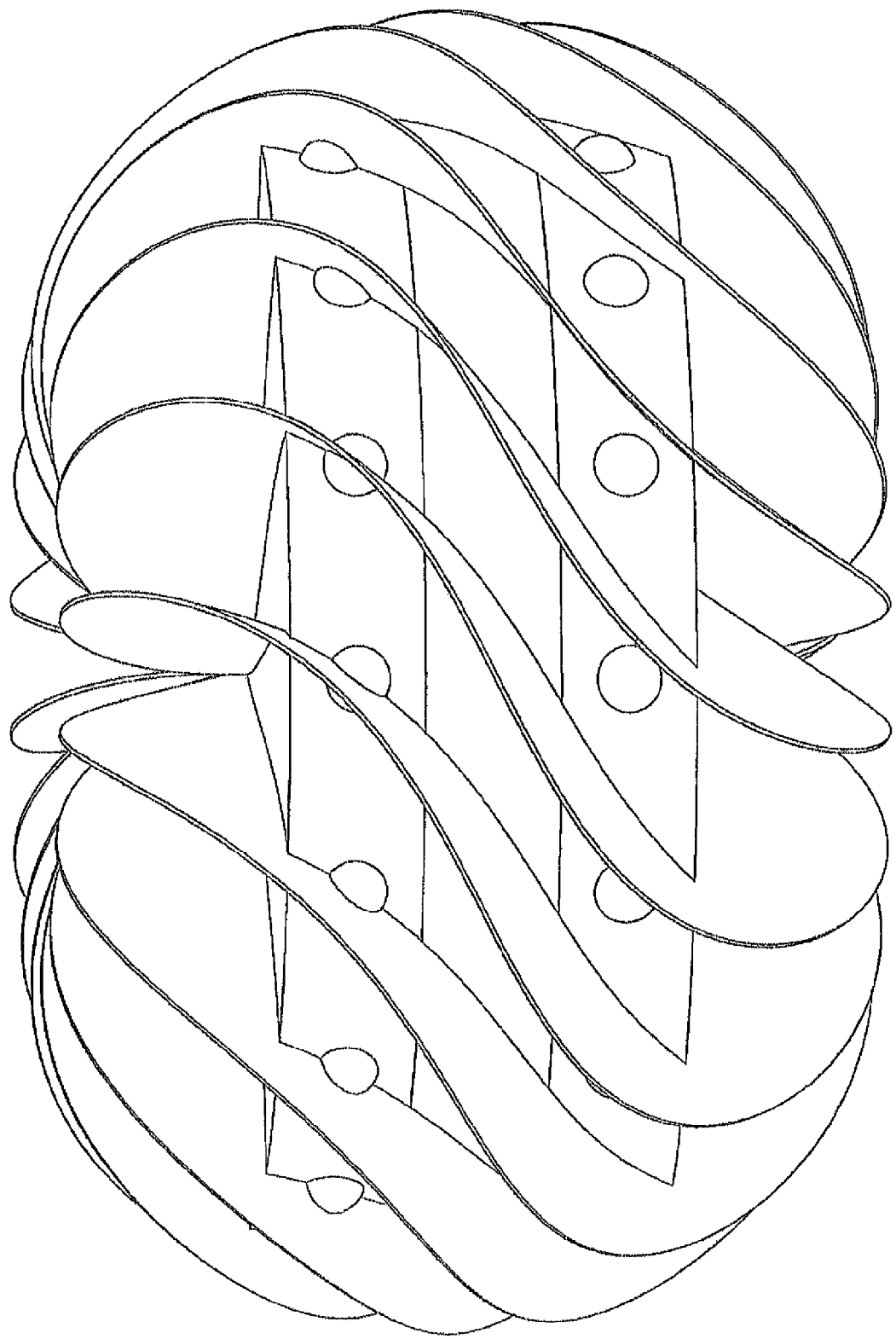
FIG. 16 illustrates a dual emitter plane complex rotational field linear phase and amplitude electromagnetic field scenario that can be generated by the present invention.

Complex spin geometries (see the electromagnetic field representations of FIG. 16) are possible with discrete phased timing sequences applied to each emitter with regard to separable distance located emitters in adjacent planes or positions in the same plane.

Figure 17:
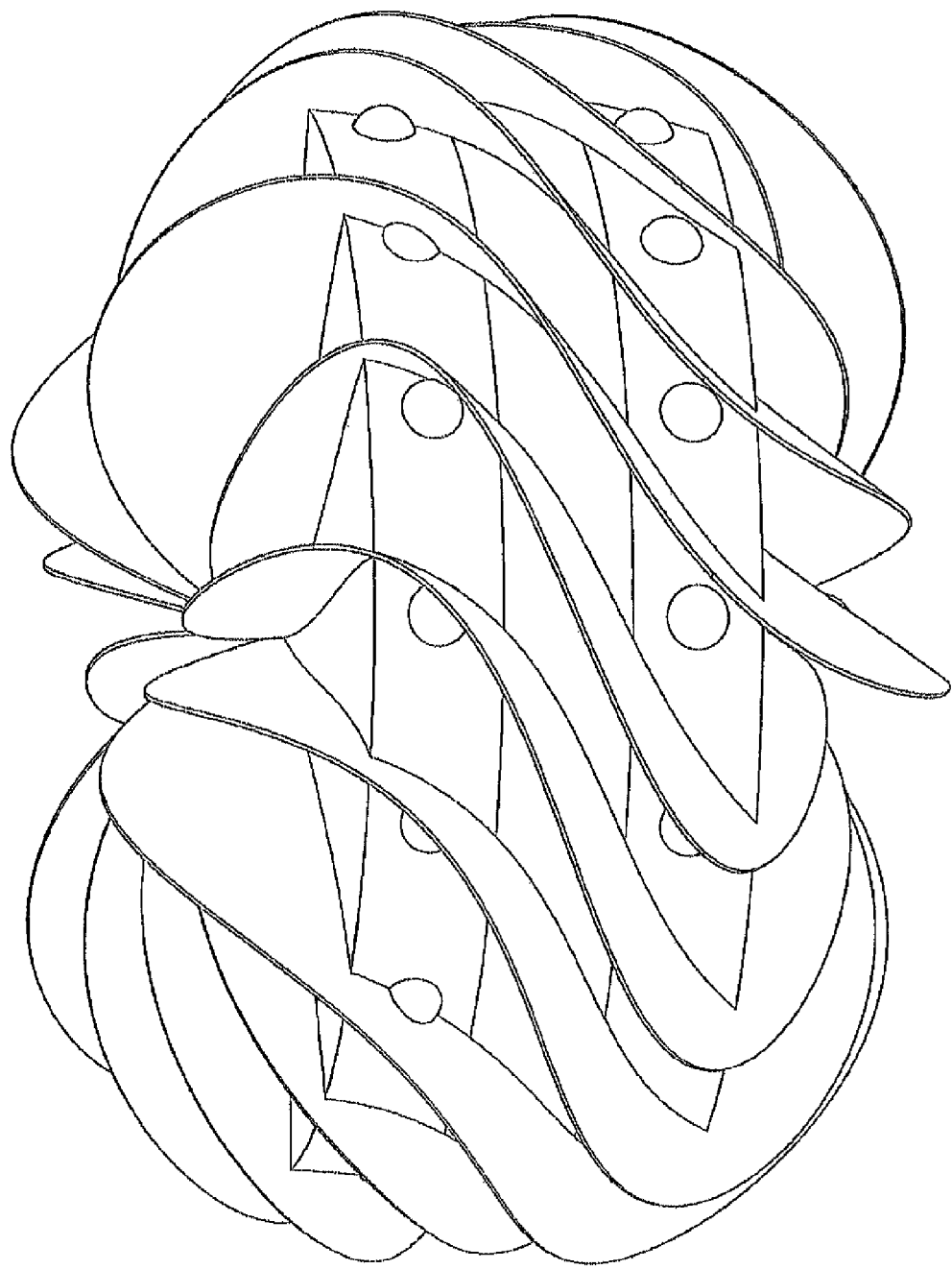
FIG. 17 illustrates a dual emitter plane complex rotational field stepped amplitude electromagnetic field scenario that can be generated by the present invention.

Further, changes to the spinning resonant field are possible with dynamic amplitude adjustment of emitter element facets where the amplifier gain of the driving circuit is manipulated (See FIG. 17) where field lines are of variable gain amplitude, represented as field planes of various heights.

Figure 18:
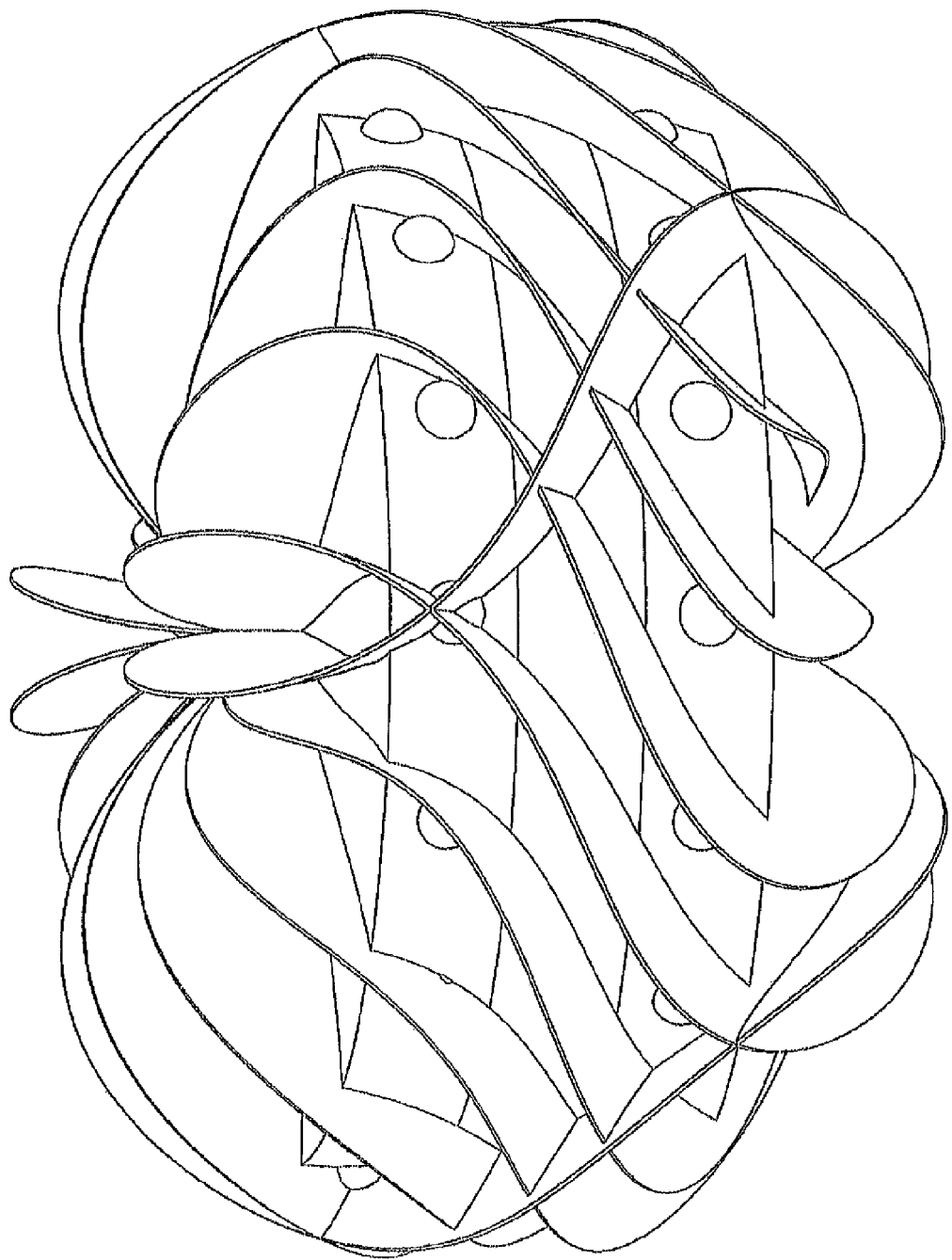
FIG. 18 illustrates a dual emitter plane complex rotational field stepped amplitude and single inverse spun interference node electromagnetic field scenario that can be generated by the present invention.

Additional complex modes are possible with the addition of counter spinning interference field segments where the field is spinning in one geometry, and at least one chirped interference mode is spun independently (see FIG. 18) where a variable amplitude spin geometry is applied to the entire array and a chirped mode is spun at quadrant angles in the opposite direction, or the same direction at a different spinning speed, is applied to the array simultaneously.

Amplifier circuitry (FIG. 2A) receives high voltage and current via Input (Drain-Supply+), and low control voltage is received at +12 vdc Input. The circuitry is populated with a global ground as illustrated with down arrow indicators.

External control PWM may be set to the clock frequency of the amplifier circuit as received at input "External PWM Oscillator Input" with the example circuit set at 3.94 Mhz. However any frequency that is complimentary to the Primary coil and secondary coil resonance and within the amplifier operational limits may be selected.

Figure 22:
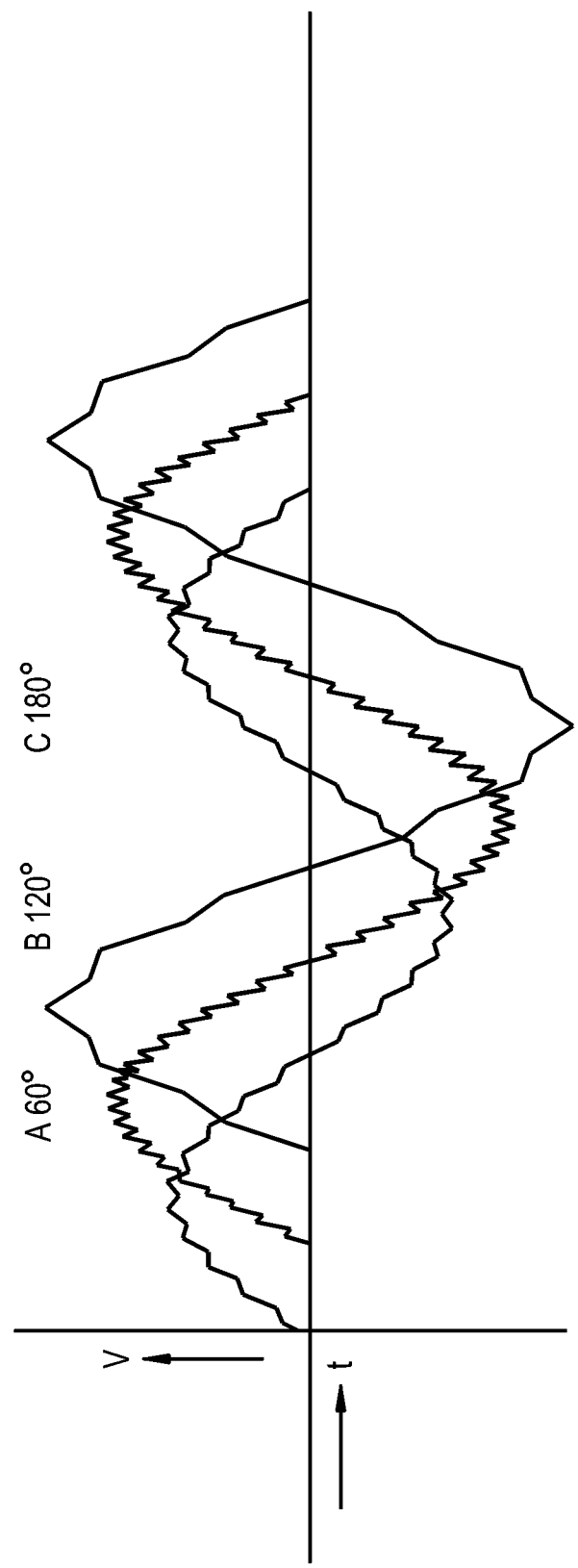
FIG. 22 illustrates three phases shown with differential amplitude and differential modulation on each discrete phase that can be generated by the present invention.
Figure 23:
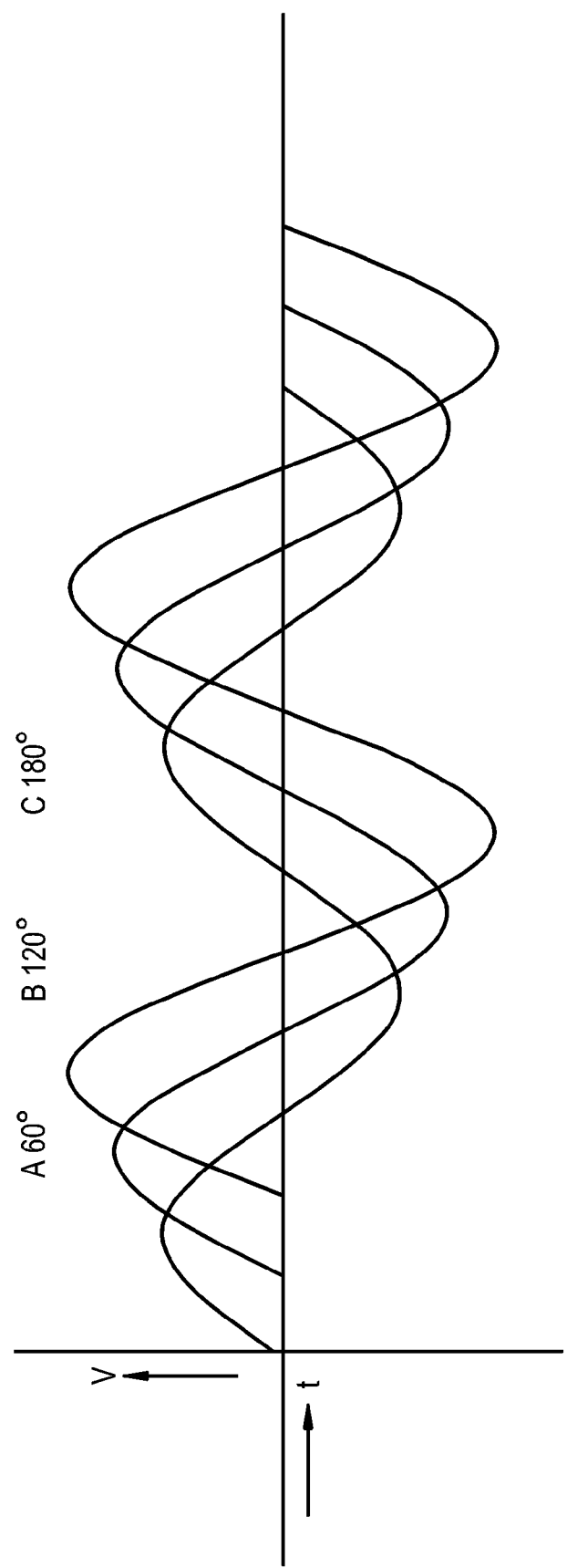
FIG. 23 illustrates three phases shown with differential amplitude alone that can be generated by the present invention.

External control modulation with discrete or complimentary modulation can be injected into the amplifier circuit by way of "External Modulation Input" (FIG. 2A) resulting in discrete phase modulation such as is shown in FIG. 22 (modulated waveform) versus FIG. 23 (clean waveform), This allows for unique harmonic complex functions within the spinning field at discrete angles related to the position of the interacting field lines.

Regarding the resonant oscillator, prior art teaches an electronically resonant single stage resonator (see FIG. 4C) containing a system 300c made up of primary windings 301c tuned with a tank capacitance 306c and coupled via air gap space insulator 302c to secondary transformer 303c with secondary voltage outputted to electrical lead 304c with a voltage differential to earth ground 307c and a capacitive top load output of 305c producing a resonant voltage increase of many magnitudes over the voltage applied to the primary windings. Also know in the field, however seldom used, is a more complex derivative of the stacked resonator, called a Magnified resonant oscillator 350d typically built as in FIG. 4D. The primary voltage is tuned with tank capacitance 360d into the inductance of primary coil 351d against earth ground 361d. Primary windings 351d is tuned with tank capacitance 360d and coupled via air gap space insulator 352d to secondary transformer 353d.

Energy in the primary windings circuit is induced into the secondary windings 353d where its output voltage at resonance is stepped up and outputted to an electrical lead 354d to a secondary tank capacitance 355d to an output lead 356d into a third set of windings 357d, in the free field usually spaced significantly away from the primary windings and out of significant coupling to the inductance field of the primary windings.

Voltage in the third windings 357d is again stepped up with a separate LC tuning of its inductance with the capacitance of top load 359d via electrical lead 358d. The voltage potential of the magnified resonate oscillator is capable of being well into the millions of volts however coupling efficiency of the system still is typically less than 80% resulting in a total system efficiency of a lower value than ideal.

Figure 4B:
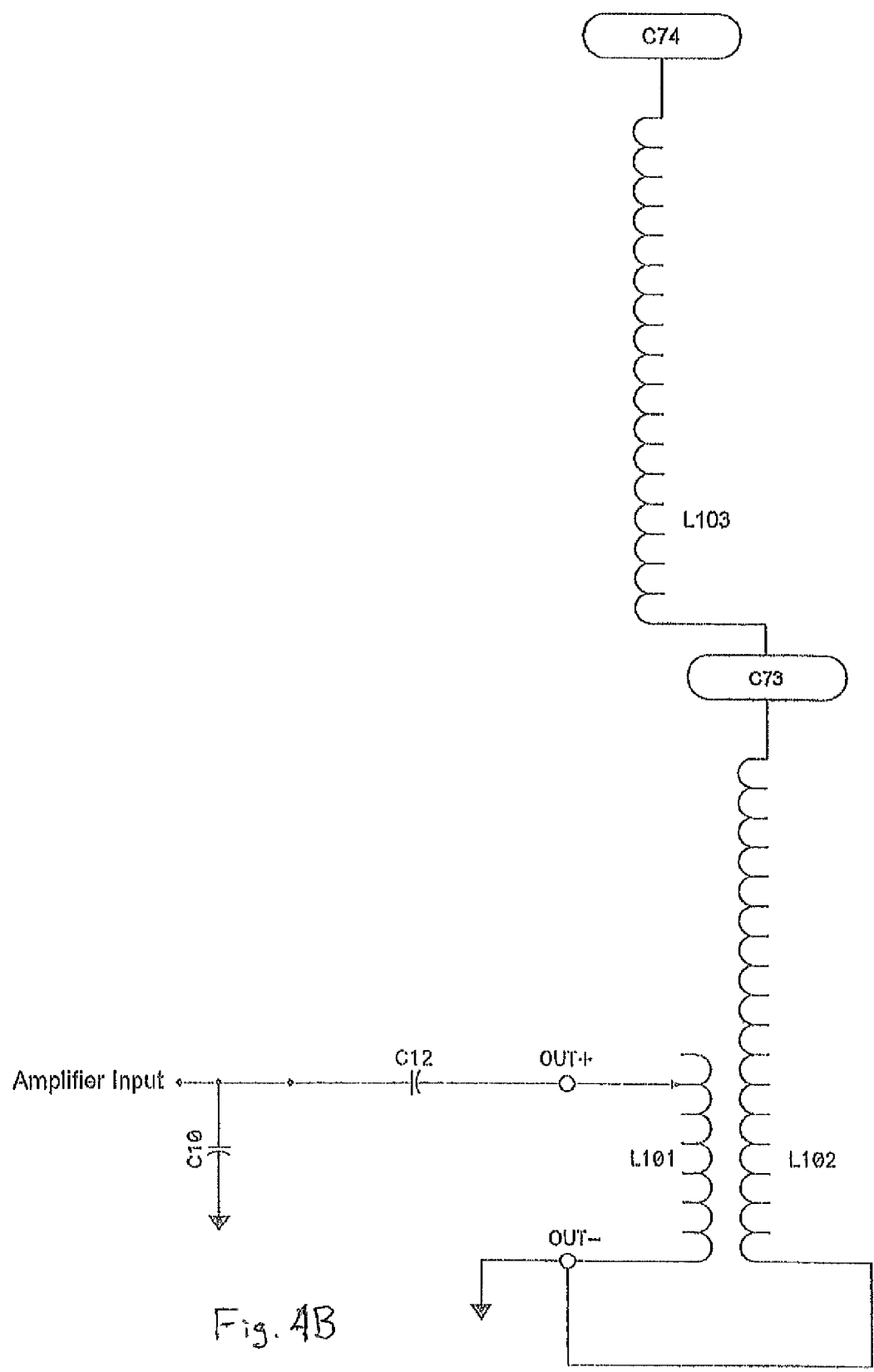
FIG. 4B is a multi-stage resonant oscillator.
Figure 4C:
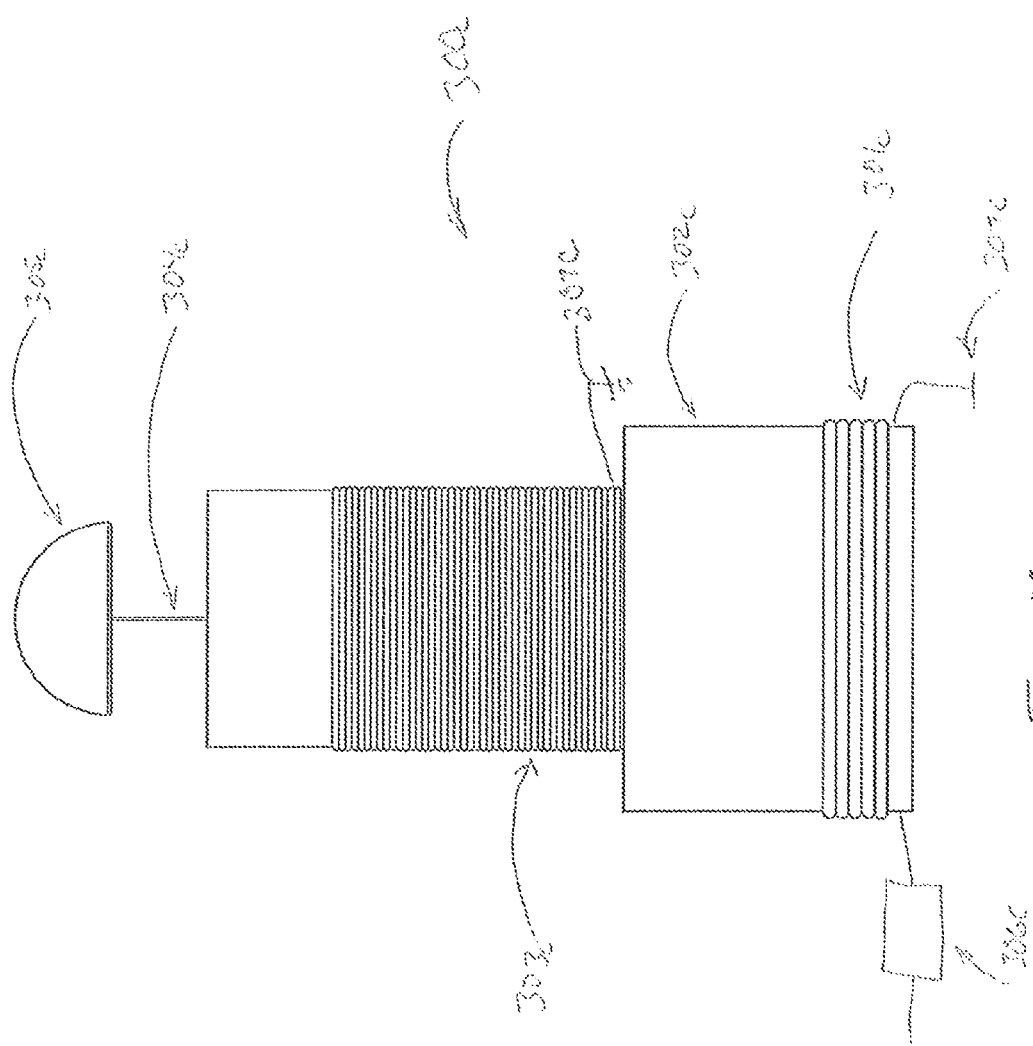
FIG. 4C is a multi-stage resonant oscillator.
Figure 4E:
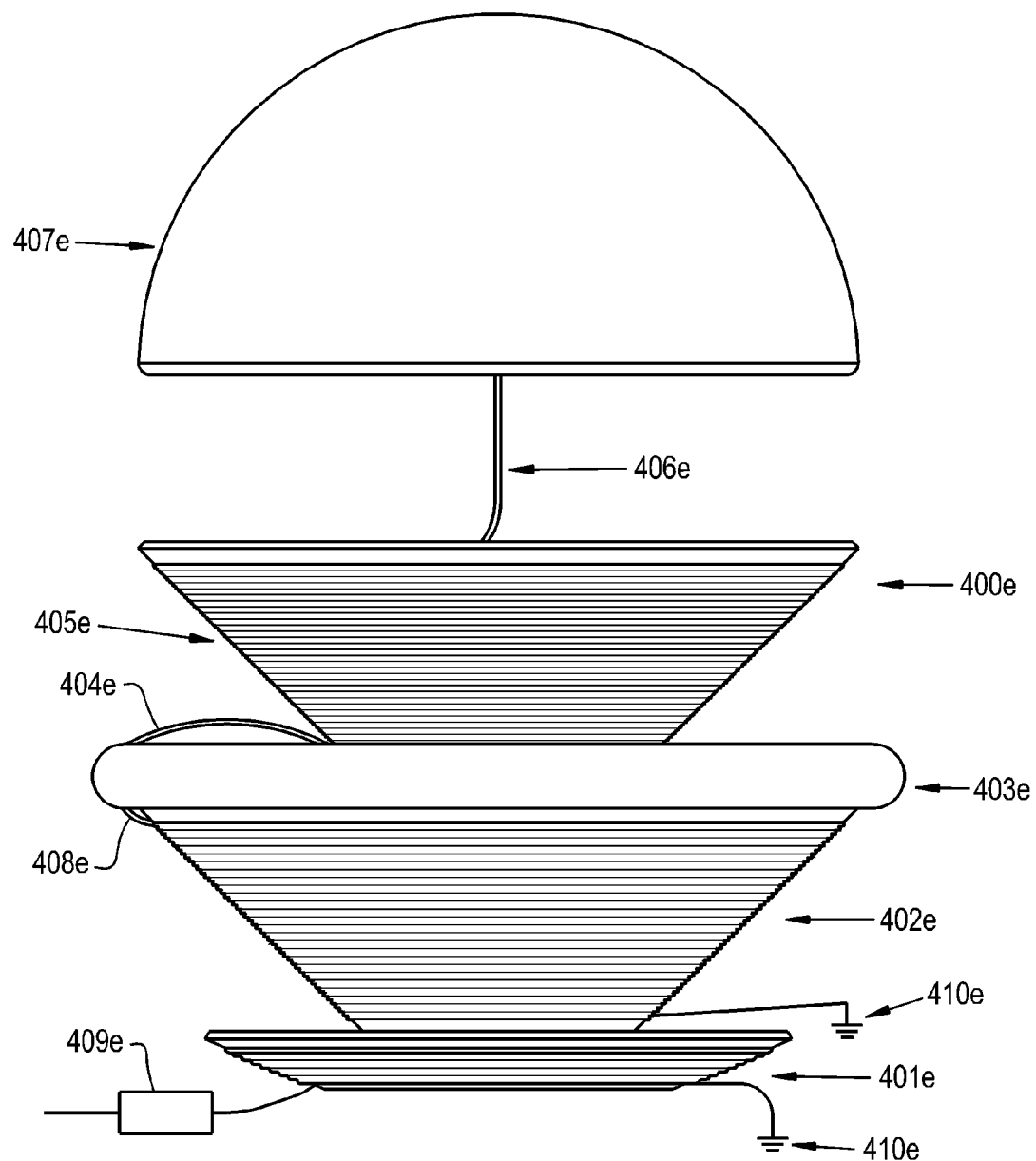
FIG. 4A illustrates a single stage resonant transformer circuit.
FIG. 4D illustrates a magnified resonant oscillator that may be used by the present invention.
FIG. 4 E illustrates a high efficiency compact folded magnifier resonant oscillator that may be used by the present invention.
FIGS. 4F and 4G illustrate two configurations for a compact folded magnifier design that may be used by the present invention.

In contrast, a compact folded magnifier resonant oscillator, which is a high efficiency compact folded magnifier resonant oscillator 400e is illustrated in FIG. 4E. The oscillator is constructed with a tank capacitance 409e tuning the inductance of angled cone primary windings 401 e to a target frequency resonance relative to ground 410e. Energy stored in the primary windings 401e is inducted to angled cone secondary windings 402e. Winding 402e is coupled to ground 410e and with lead 408e to and tuned with toroid capacitance tank 403e.

The stepped high voltage is coupled to an additional angled cone secondary windings 405e via tuned length lead 404e where winding 405e is located within the inductance field of the primary windings 401 e and secondary winding 402e and allowed to step the output voltage to increasing higher potentials with the output of windings 402e and the inductance field of 401e and 402e.

Output of the 405e windings is tuned with the inductance of the 405e windings, length of the lead 406e, and the capacitance value of sphere or half-sphere top-load 407e.

Figure 4F:
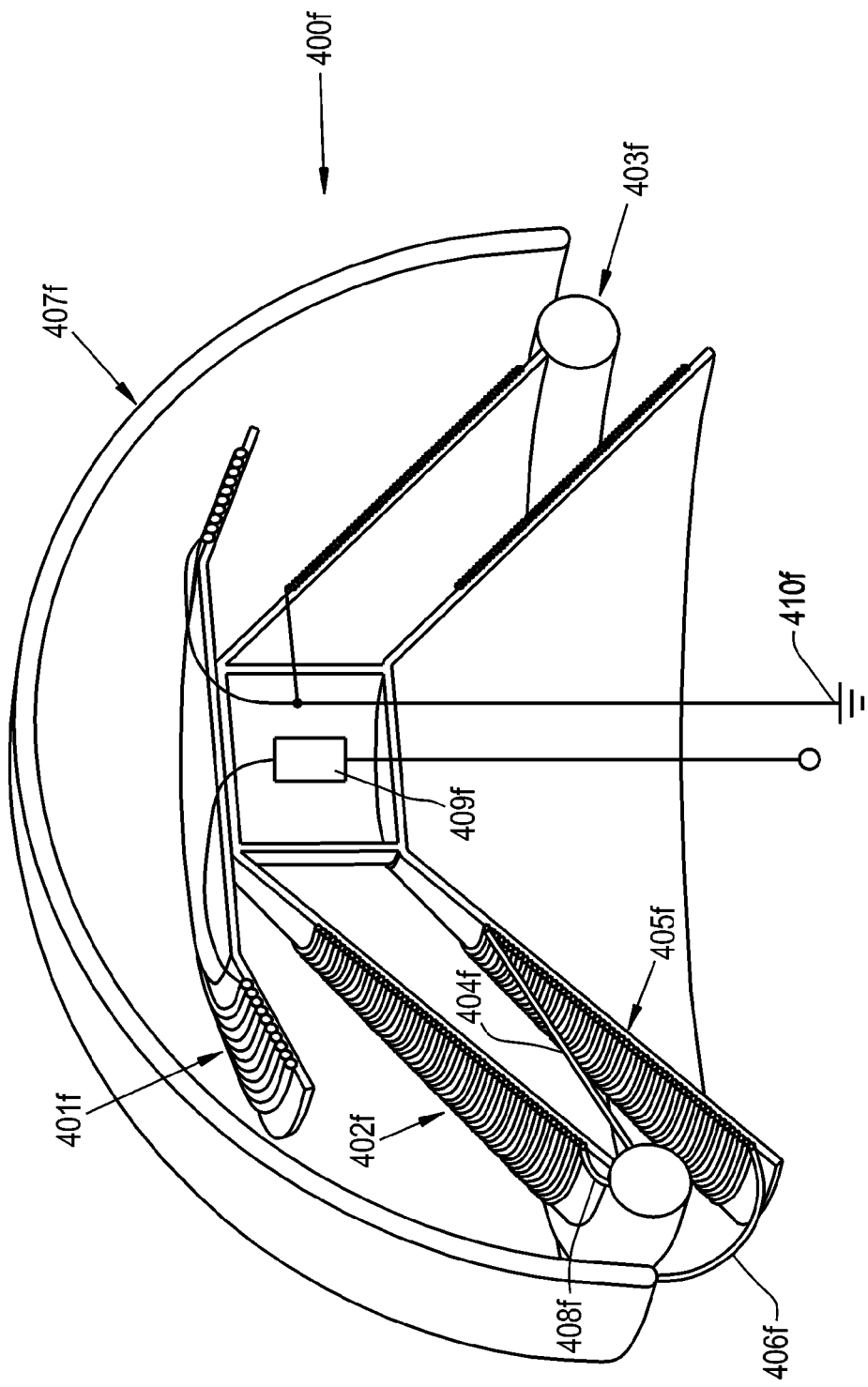
Figure 4G:
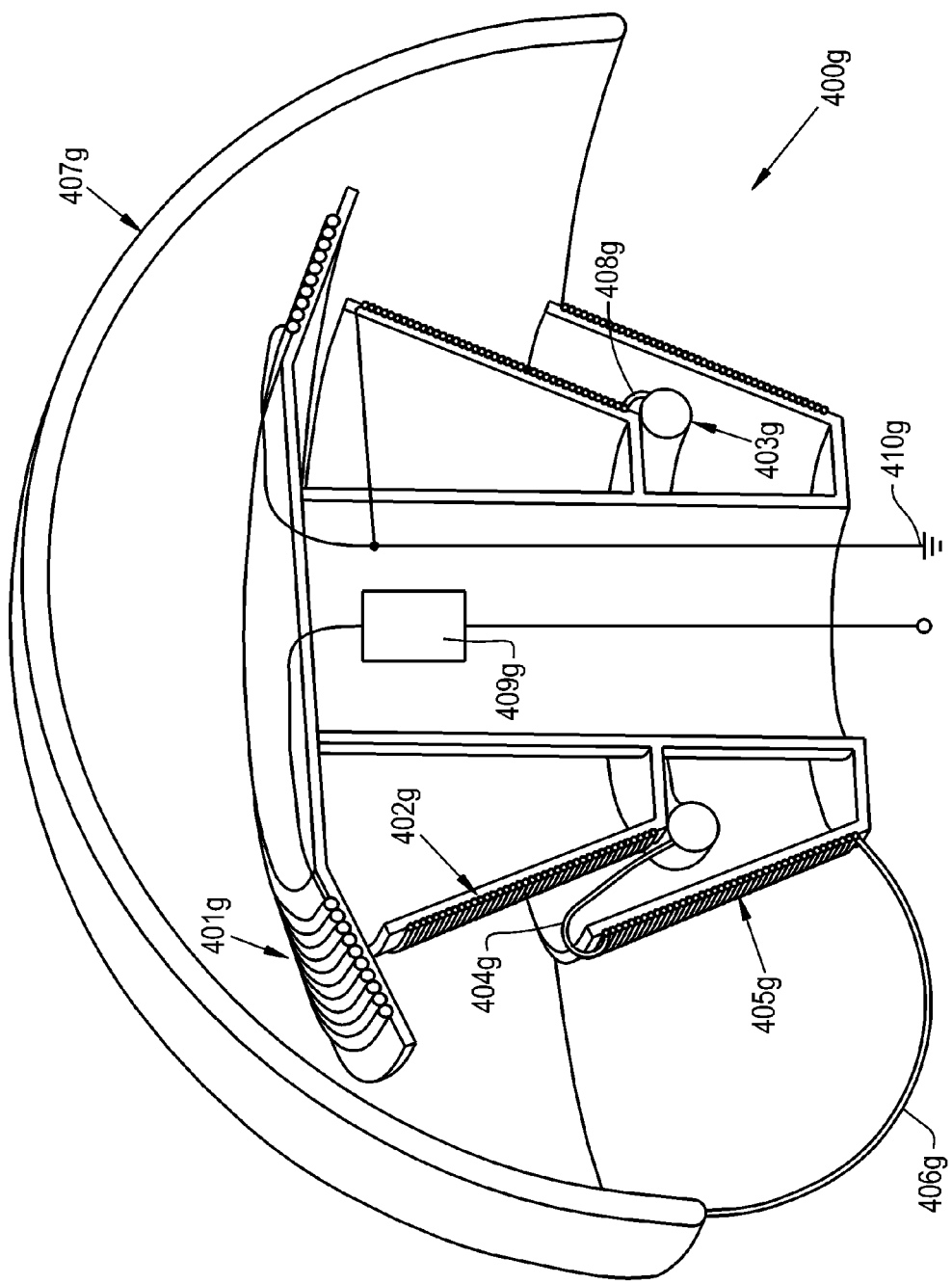

Cross sectional drawing FIGS. 4F and 4G provide two configurations possible in the compact folded magnifier design although other configurations are also contemplated. In FIG. 4F, compact folded magnifier 400f has a tank capacitance 409f tuning the inductance of angled cone primary windings 401f to a target frequency resonance relative to ground 410f. Energy stored in the primary windings 401f is inducted to angled cone secondary windings 402f. Winding 402f is coupled to ground 410f and with lead 408f to and tuned with toroid capacitance tank 403f. The stepped up high voltage is coupled to an additional angled cone secondary windings 405f via tuned length lead 404f where winding 405f is located within the inductance field of the primary windings 401 f and allowed to step up the output voltage to increasing higher potentials with the output of windings 402f and the inductance field of 401f. Output of the 405f windings is tuned with the inductance of the 405f windings, length of the lead 406f, and the capacitance value of sphere or half-sphere top-load 407f.

In FIG. 4G, compact folded magnifier 400G has a tank capacitance 409G tuning the inductance of angled cone primary windings 401G to a target frequency resonance relative to ground 410G. Energy stored in the primary windings 401G is inducted to angled cone secondary windings 402G. Winding 402G is coupled with ground 410G and lead 408G to and tuned with toroid capacitance tank 403G. The stepped up high voltage is coupled to an additional angled cone secondary windings 405G via tuned length lead 404G where winding 405G is located within the inductance field of the primary windings 401G and steps up the output voltage to increasing higher potentials with the output of windings 402G and the inductance field of 401G. Output of the 405G windings is tuned with the inductance of the 405G windings, length of the lead 406G, and the capacitance value of sphere or half-sphere top-load 407G.

Primary and secondary windings can be potted or immersed in transformer oil to allow for high voltage operation to prevent strike over.

Figure 5:
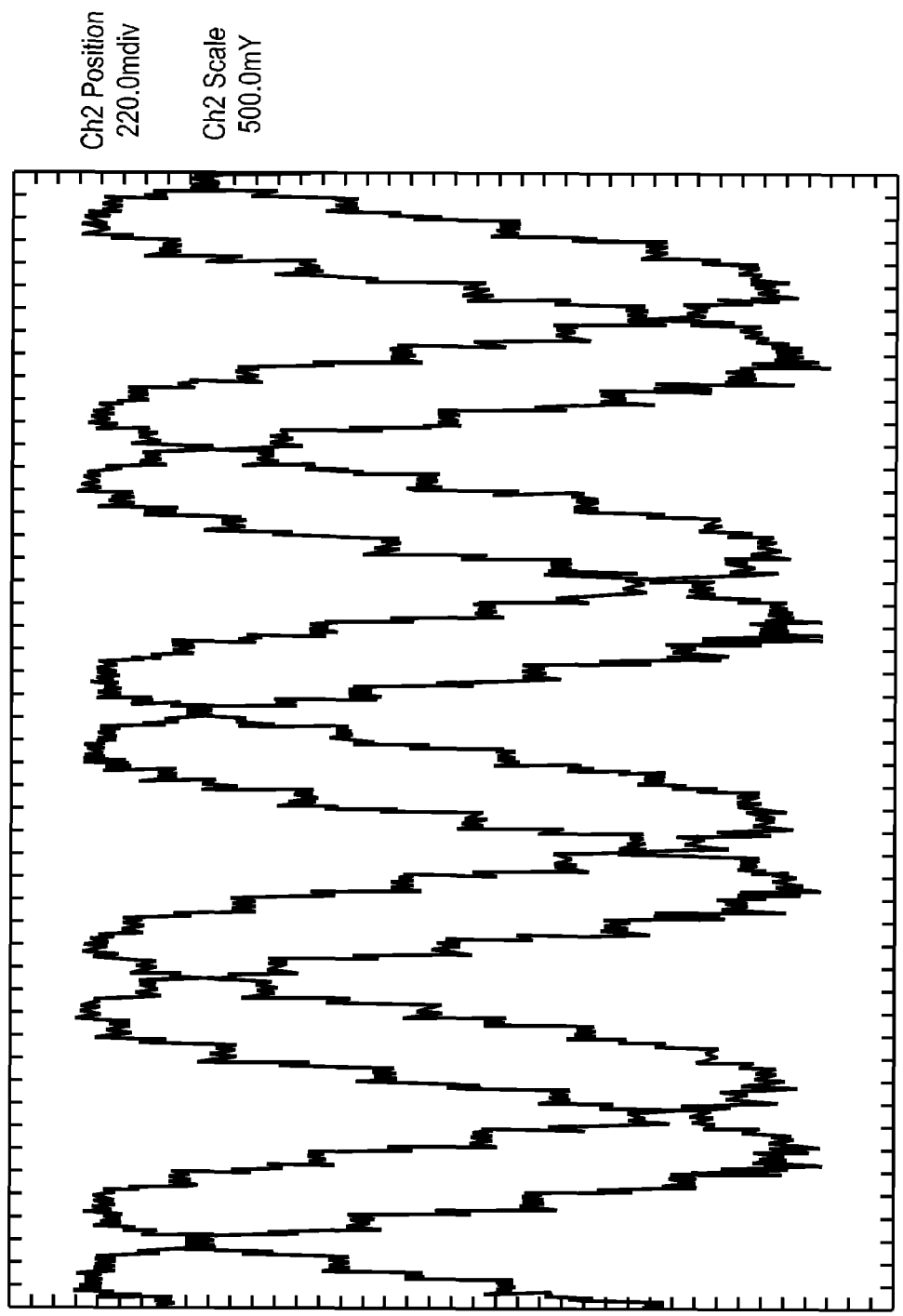
FIG. 5 shows an oscilloscope output of a Pulse Width Modulation (PWM) waveform that is generated by the present invention.

Regarding the complex waveforms and spinning field signal generation aspect of the present invention, FIG. 5 illustrates a pulse width modulation stepped waveform of the PWM class-E amplifiers and the tank capacitance of the circuit along with the resonant buffer of the primary coil that smooth's the waveform.

Multi-phased electrical systems are known in the field although usually at very low frequency such as the electrical power grid where the phase angle of the three phases are fixed at set angles of 120 degrees of separation. In the inventive embodiments discussed herein drive circuitry and emitters, located in an array, provide the ability to select a poly-phased configuration with dynamic functions. This invention includes the ability to generate a dynamically changing poly-phased spinning electrical field of high-tension voltage having resonant or quasi-resonant high frequency characteristics.

Figure 6:
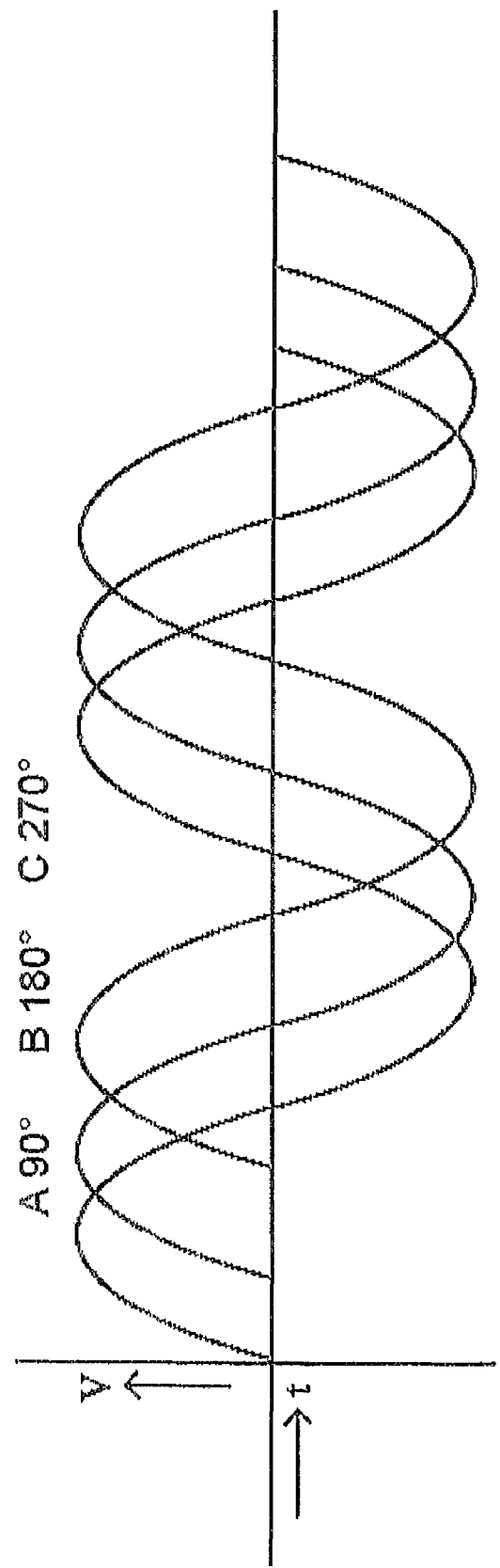
FIG. 6 illustrates three phase waveforms in simple nominal phase relationship that can be generated by the present invention.
Figure 7:
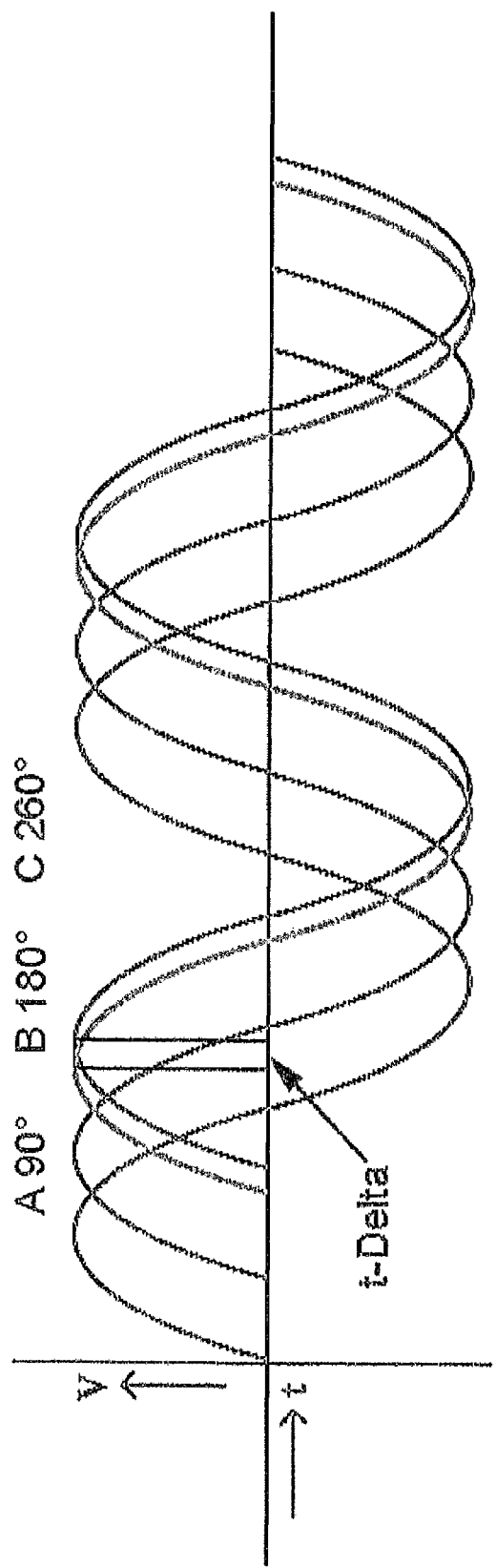
FIG. 7 illustrates three phase waveforms in poly phased "manipulated" form that can be generated by the present invention.
Figure 8:
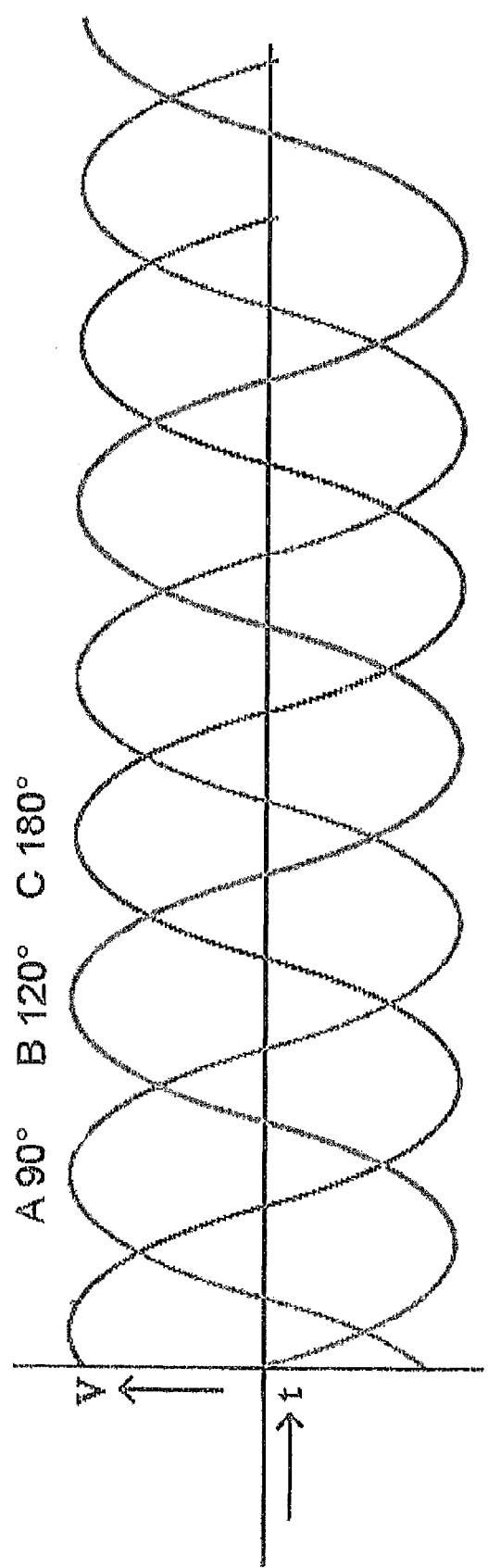
FIG. 8 illustrates three phase waveforms in 90/180/270 degree relationship.
Figure 9:
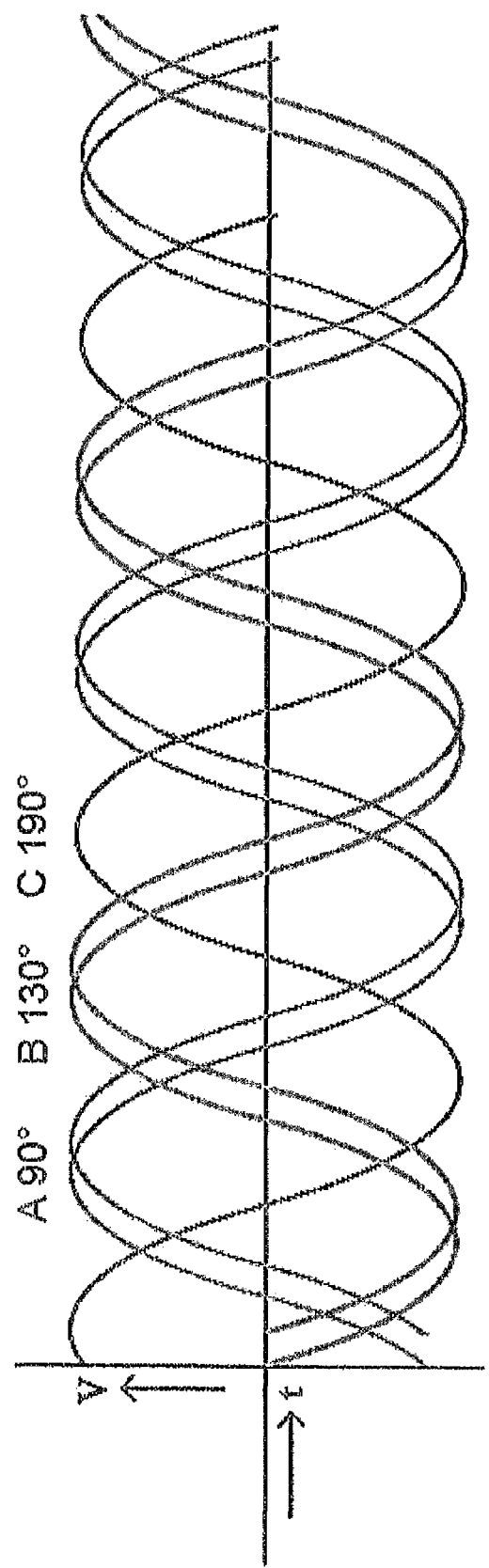
FIG. 9 illustrates three phase waveforms in a linear phase delay relationship.

FIG. 6 shows three discrete phases with 90/180/270 degrees phase centers, and FIG. 7 shows the same three phases with a time delay applied to the third phase alone. FIG. 8 shows same three phases on 120 degree centers. FIG. 9 shows the three phases with a common delay applied to the second and third phase in relationship to the first unchanged phase.

Figure 10:
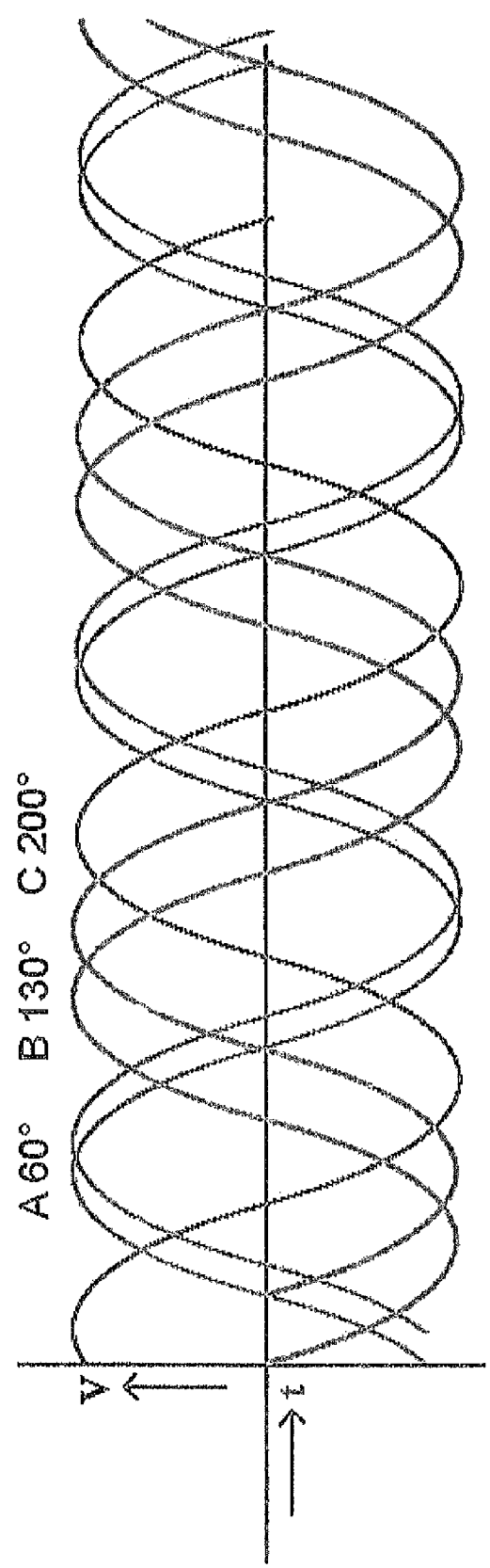
FIG. 10 illustrates three phase waveforms in a logarithmic phase delayed relationship.
Figure 11:
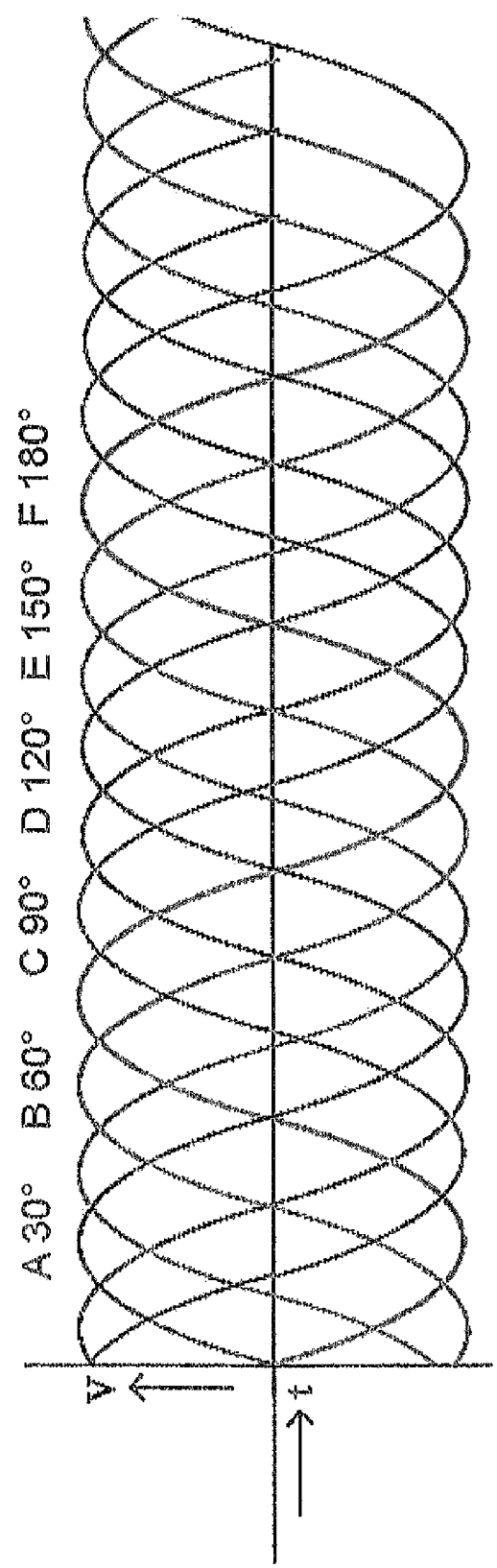
FIG. 11 illustrates six phase waveforms in nominal phase relationship.
Figure 12:
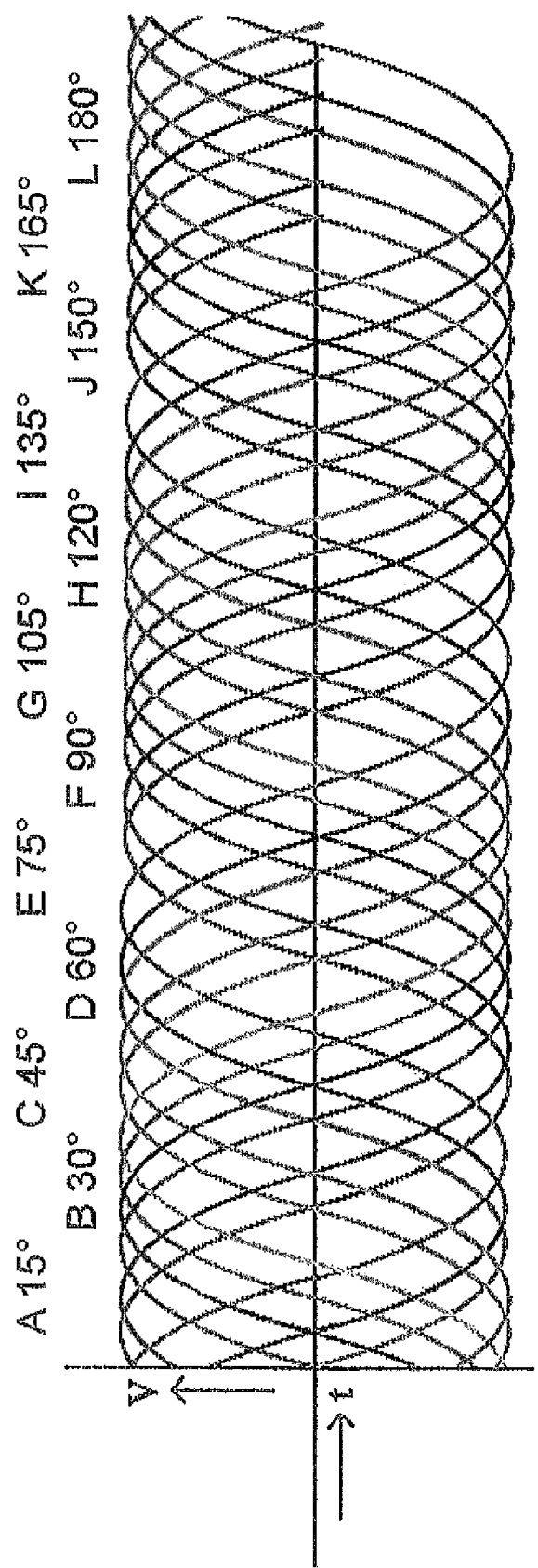
FIG. 12 illustrates twelve phase waveforms in nominal phase relationship.

FIG. 10 shows the three phases with a differential logarithmic delay applied to the second and third phases in relationship to the first unchanged phase. FIG. 11 shows the possibility of 6 phases in 60 degree phase relationship, and FIG. 12 shows the possibility of 12 phases In a 30 degree phase relationship. These are just sample waveforms that can be used to create complex spinning electromagnetic fields with the present invention.

Common Prior-Art magnifier resonant oscillator circuits utilize primary voltages of 5-15 kv that are electro-mechanically switched at frequencies of 1 khz-500 kHz; however, they are at a fixed resonant frequency and fixed phase relationship on the basis of mechanically spaced switching poles spun by a rotary disc switch, with no differential processed waveform or modulation possible.

With the present invention Class-E and other Amplifier Classes allow possible designs to power discrete primary exciter circuits that are dynamically capable of any phase/frequency/amplitude/modulation. This advantageously allows an engineer the ability to manipulate any and all attributes of the primary drive waveform presented to a Multi-stage magnifier device producing novel capabilities in an arrayed configuration of discrete devices.

Mosfets Q8 and Q12 of FIG. 2A can be ganged to produce a circuit of increased output power in the event one device is not sufficient to accomplish the design needs or where an application requirement is of larger capacity than could be attained by a singular device. Mosfets Q8 and Q12 may, for example be IXFH16N5OP devices capable of up to 500v and 16 amps; however, long lifetime requirements might suggest its use at a lower voltage/current than that of its maximum power ratings. Understanding the application requirements of current allow a designer to select the appropriate number of units to share the work load of the primary of a larger system requirement.

Prototype systems built to date have utilized several different primary voltage levels and winding ratios of primary windings to secondary windings to magnifier slaved windings with good results of a primary to secondary of 8-20:1 and a good secondary to magnifier slaved winding of 5-15:1 although other ratio's and configurations are contemplated and may be even more optimized, dependent on the nature of the device and it's relevant resonance frequency tuning A workable configuration, as is shown in the circuit of FIG. 4B and depicted in FIGS. 4D and 4E, has a primary voltage output of 300v from the class-E amplifier output stage and with, for example, 5-6 turns of 14 ga wire in the primary windings 351d of FIG. 4B is tuned with tank capacitance 360d to set resonance at 3.94 MHz in the secondary windings 353d with 60 wraps of 20 ga. wire is tuned by the turns ratio of winding 353d to windings 351d and the trim length of the lead 354d.

For example, slave windings inductance of windings 357d with 480 wraps of 23 ga. wire is tuned with the capacitance of capacitor 355d and the length of wire 358d with the top load capacitance of top load 359d to set resonance of the device at 3.94 MHz of the slaved windings output as projected from capacitance half sphere 359d for step up output voltage of 3-5 million volts at resonance of 3.94 Mhz.

Other folded resonant oscillator designs such as FIGS. 4G and 4F incorporate also the chirped inductance field effects of secondary 402g and magnifier slave windings 405g located operationally largely within the induced electrical field of the primary windings 401g.

Vehicle 1002 is for transporting mass, with the present invention that provides lift control in multiple axes, for example in the X, Y and Z directions, providing for force control that is not limited to the constrained systems of current maglev trains.

The plurality of electrodes 1008 are selectively coupled to an electrical output of an individual electromagnetic field generator 1010 and the other electrical output of generator 1010 is selectively coupled to another electrode 1008 or the chassis or face 219, 235. The selection is under the control of controller 1012, which is configured to dynamically switch the electric potential outputs of generator 1010 to the selected electrodes 1008 thereby projecting spinning electromagnetic fields from the plurality of electrodes. The programming of controller 1012 controls the coupling of the outputs of generators 1010 to electrodes 1008, the power supplied to generators 1010 to control the amplitude of the electromagnetic fields at the selected electrodes 1008, the phase of the output of generators 1010, and of course the harmonic frequencies that are generated by the interaction of the spinning electromagnetic fields. The details of the programming will be the subject of another patent application, the details of which are not claimed in the claims section of this application. It is generally known how to program a controller to select electrical pathways, to select power amplitudes and frequencies, which when combined with the elements of the present invention and the geometry of the electrodes 1008 can produce complex rotating electromagnetic fields, which are illustrated by example in some of the figures.

The rotating electromagnetic field generation device 1006 can cause adjacent electrodes 1008 to have an electrical phase and/or an electrical amplitude difference. The positioning of the electrodes in a pattern allows the controller 1012 to have multi-axis control and phasing of the spinning multi-poled electromagnetic fields. The resulting fields can have at least one of the spinning electromagnetic fields spinning about an axis that is non-coaxial relative to an axis of another of the spinning electromagnetic fields, to thereby create a three dimensional complex electromagnetic field scenarios capable of lifting and propelling vehicle 1002.

Controller 1012 is configured to cause adjacent electrodes to have fundamental and modulated differential harmonics therebetween, since controller 1012 is in control of the interconnections of the electrodes 1008 with outputs of generators 1010 and the output of each generator 1010. Additionally, controller 1012, along with the electromagnetic field generators 1010 and the electrodes 1008 are configured to project at least two shaped discrete electromagnetic fields with rotational relationships therebetween, as can be seen in some of the figures. Yet further, the arrangement can project at least two shaped discrete electromagnetic fields that produce harmonics from their interaction. The fields themselves each have a rotational characteristic. Yet still further, the fields, each rotating about an axis which can differ from each other, which can be more generally described as being non-coaxial with each other, and can be further described as being a non-coaxial rotational characteristic.

While the electromagnetic field strength is variable under the control of controller 1012, the present invention can exhibit an electromagnetic field strength of greater than 1,000 Gauss, as measured in a target area, which may be proximate to electromagnetic field generation device 1006. The rotating electromagnetic field generation device 1006 projects an electromagnetic field that substantially surrounds the rotating electromagnetic field generation device 1006 and even substantially surrounds vehicle 1002.

The rotating electromagnetic field generation device 1006 controls the multiple electromagnetic field generators 1010, which each include a single-stage or a multi-stage resonant transformer to generate the high frequency at strong electromagnetic field strengths.

Capabilities and advantages of the present invention include:

1. Multi-discrete electrode poles can be discretely energized as a cathode, an anode or a chassis ground relative to any other pole(s) or the local material support body or material target.

2. Pole(s) are discretely energized allowing for differential phase relationships relative to adjacent pole(s) to thereby allow for the generation of complex shaped and spinning electromagnetic fields.

3. Pole(s) or sets of poles can be selected by controller 1012 allowing for a full phase triad or other complex phase geometry in at one or more axes.

4. The pole geometry can be arranged to allow for multi-axis control of, and phasing of, a spinning and/or counter-rotational spinning multi-poled electromagnetic field.

5. Pole electrical control and processing of discrete poles allows for fundamental and modulated differential harmonics relative to discrete or adjacent pole(s).

6. Multi-staged resonant electrical circuitry is used to generate high efficiency electrical fields of greater than 1Mhz with rotational phase harmonic effects of greater than 1 rpm.

7. Torus radial field configurations with static and/or rotational characteristics are coupled to and/or interwoven with at least one additional axial or annulus rotational field.

8. Rotational complex field geometries having at least two shaped discrete fields in similar or dissimilar rotational relationships are used to produce sum/difference harmonics in either rotational or counter-rotational relationships.

9. Spinning complex electrical fields generate electromagnetic field energy of greater than 1,000 Gauss in a targeted area.

10. Spinning electromagnetic field geometries with rotational or counter-rotational fields are contained within a plasma field about a target material or material area.

11. Spinning electromagnetic field generator 1006 contained within a structure 1002 can radiate a complex spinning and/or complex counter-rotational spinning field around the structure to influence the material properties of the structure contained therein.

12. Spinning electromagnetic field generator 1006 can be contained within a structure 1002 to radiate a complex spinning and or a complex rotational spinning field directed towards a target to influence the material properties of the target.

13. Discrete electronic modular amplifiers using resonance to efficiently excite a multi-stage resonant transformer circuit where the resonance of the circuit and of the transformer stages may have similar frequencies and/or dissimilar frequencies.

14. Electronic circuitry is used with selected electrical resonance at a frequency and an input of a secondary modulation is used to create a complex carrier and modulation waveform to excite a multi-stage resonant transformer having a tuned harmonic relationship.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A mass transport device, comprising:
   a vehicle for transporting mass;
   a lift system coupled to the vehicle, the lift system including a rotating electromagnetic field generation device having:
   a plurality of electrodes;
   a plurality of electromagnetic field generators each having a first electric potential output and a second electric potential output; and
   a controller configured to dynamically switch the first electric potential output and the second electric potential output of each of the plurality of electromagnetic field generators to corresponding selected ones of the plurality of electrodes thereby projecting an electromagnetic field from the plurality of electrodes, the electromagnetic field being used to at least one of lifting and propelling the vehicle.

2. The mass transport device of claim 1, wherein adjacent ones of the plurality of electrodes have an electrical phase and/or an electrical amplitude difference.

3. The mass transport device of claim 1, wherein the electrodes are positioned in a pattern configured to allow the controller to have multi-axis control and phasing of spinning multi-poled electromagnetic fields.

4. The mass transport device of claim 3, wherein at least one of the spinning electromagnetic fields spins about an axis that is non-coaxial relative to an axis of an other of the spinning electromagnetic fields.

5. The mass transport device of claim 1, wherein the controller is configured to cause adjacent electrodes to have fundamental and modulated differential harmonics therebetween.

6. The mass transport device of claim 1, wherein the controller, the electromagnetic field generators and the electrodes are configured to project at least two shaped discrete electromagnetic fields with rotational relationships therebetween.

7. The mass transport device of claim 6, wherein the at least two shaped discrete electromagnetic fields produce harmonics having a rotational and/or a non-coaxial rotational characteristic.

8. The mass transport device of claim 1, wherein the electromagnetic field has a strength greater than 1,000 Gauss in a target area.

9. The mass transport device of claim 1, wherein the electromagnetic field substantially surrounds the rotating electromagnetic field generation device.

10. The mass transport device of claim 1, wherein the vehicle is a train.

11. A rotating electromagnetic field generation device, comprising:
a plurality of electrodes;
a plurality of electromagnetic field generators each having a first electric potential output and a second electric potential output; and
a controller configured to dynamically switch the first electric potential output and the second electric potential output of each of the plurality of electromagnetic field generators to corresponding selected ones of the plurality of electrodes thereby projecting at least one electromagnetic field from the plurality of electrodes.

12. The rotating electromagnetic field generation device of claim 11, wherein adjacent ones of the plurality of electrodes have an electrical phase and/or an electrical amplitude difference.

13. The rotating electromagnetic field generation device of claim 11, wherein the electrodes are positioned in a pattern configured to allow the controller to have multi-axis control and phasing of spinning multi-poled electromagnetic fields.

14. The rotating electromagnetic field generation device of claim 13, wherein at least one of the spinning electromagnetic fields spins about an axis that is non-coaxial relative to an axis of an other of the spinning electromagnetic fields.

15. The rotating electromagnetic field generation device of claim 11, wherein the controller is configured to cause adjacent electrodes to have fundamental and modulated differential harmonics therebetween.

16. The rotating electromagnetic field generation device of claim 11, wherein the controller, the electromagnetic field generators and the electrodes are configured to project at least two shaped discrete electromagnetic fields with rotational relationships therebetween.

17. The rotating electromagnetic field generation device of claim 16, wherein the at least two shaped discrete electromagnetic fields produce harmonics having a rotational and/or a non-coaxial rotational characteristic.

18. The rotating electromagnetic field generation device of claim 11, wherein the electromagnetic field has a strength greater than 1,000 Gauss in a target area.

19. The rotating electromagnetic field generation device of claim 11, wherein the electromagnetic field substantially surrounds the rotating electromagnetic field generation device.

20. The rotating electromagnetic field generation device of claim 11, wherein the plurality of electromagnetic field generators each include a single-stage or a multi-stage resonant transformer.

* * * * *